United States Patent [19]

Jones et al.

[11] 4,388,692

[45] Jun. 14, 1983

[54] ELECTRONICALLY CONTROLLED PROGRAMMABLE DIGITAL THERMOSTAT HAVING VARIABLE THRESHOLD HYSTERESIS WITH TIME

[75] Inventors: James J. Jones, Elizabethton; John O. McIntosh, Johnson City, both of Tenn.

[73] Assignee: Texas Instruments Incorporated, Dallas, Tex.

[21] Appl. No.: 183,703

[22] Filed: Sep. 3, 1980

[51] Int. Cl.³ .......................................... G05D 23/32
[52] U.S. Cl. .............................. 364/557; 236/46 R; 165/12
[58] Field of Search ............... 364/557, 189, 178, 139, 364/141; 236/46 R; 165/11-14

[56] References Cited

U.S. PATENT DOCUMENTS

| | | | |
|---|---|---|---|
| 4,071,745 | 1/1978 | Hall | 364/557 X |
| 4,200,910 | 4/1980 | Hall | 364/557 X |
| 4,206,872 | 1/1980 | Levine | 165/12 X |
| 4,264,034 | 4/1981 | Hyltin et al. | 236/46 R |
| 4,274,145 | 6/1981 | Hendricks et al. | 364/557 |
| 4,284,126 | 8/1981 | Dawson | 165/12 X |
| 4,298,946 | 11/1981 | Hartsell et al. | 364/557 |
| 4,300,199 | 11/1981 | Yoknis | 364/557 |
| 4,308,991 | 1/1982 | Peinetti et al. | 165/12 X |
| 4,319,711 | 3/1982 | Barker et al. | 165/12 X |

*Primary Examiner*—Edward J. Wise
*Attorney, Agent, or Firm*—James P. McAndrews; John A. Haug; Melvin Sharp

[57] ABSTRACT

An electronic digital programmable wall thermostat system for controlling heating and cooling systems supplying an indoor area or space. The thermostat includes a digital clock, a display for displaying desired parameters of time and temperature and a data entry keyboard for programming the thermostat to maintain desired temperatures during selected time intervals. The heart of the system is a digital processor with memory, which responds to signals from a temperature sensing means which includes an analog to digital converter for controlling the heating and cooling systems in accordance with the sequence programmed therein. An output from the processor gates a triac on and off which in turn activates or deactivates the heating and cooling systems. In a preferred embodiment, a single chip digital processor is used to control the operation of the thermostat system, the keyboard, display and temperature sensing means being selectively scanned from output terminals of the digital processor. The processor is also programmed such that the hysteresis of the thermostat is variable with time in discrete steps. For example, in the heat mode when the triac (heat) is turned on, the hysteresis may be 0.5° F. above the set temperature for a predetermined time period (6 minutes) and then decreased to the set temperature until the triac is turned off. When the triac is turned off, the hysteresis is varied to be 0.5° F. less than the set temperature for 6 minutes and then is increased to the set temperature until the triac is turned back on.

17 Claims, 28 Drawing Figures

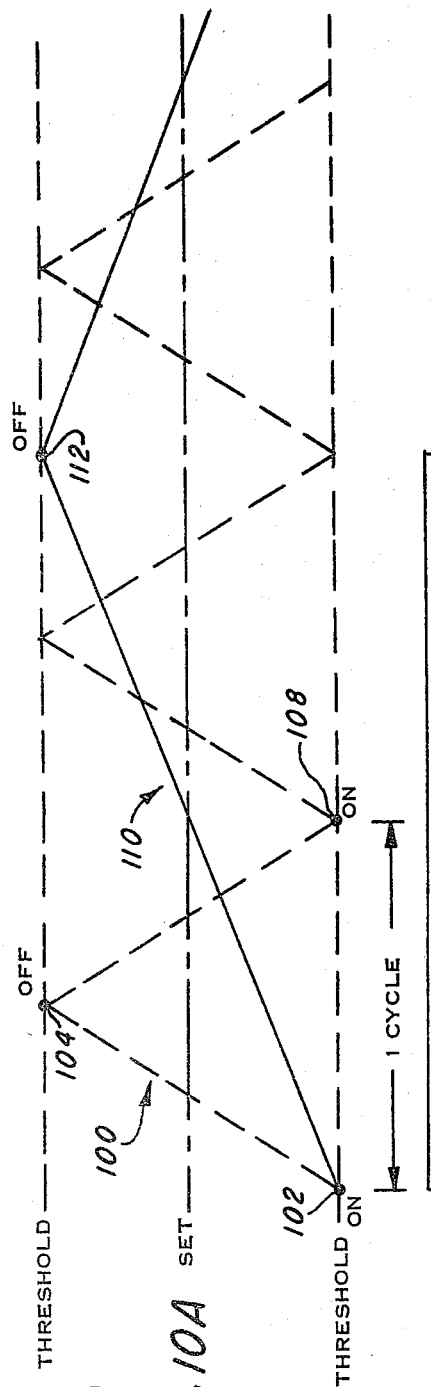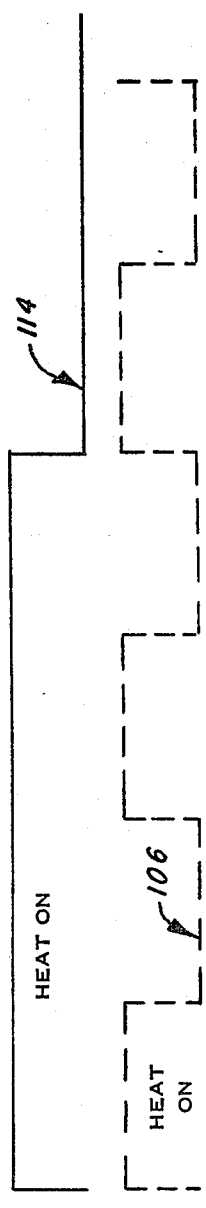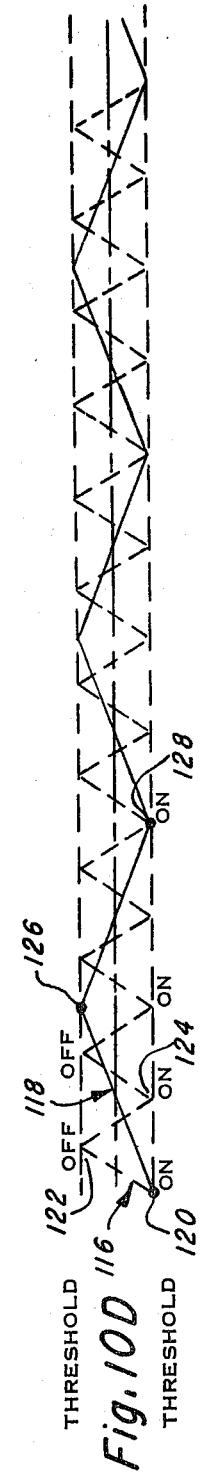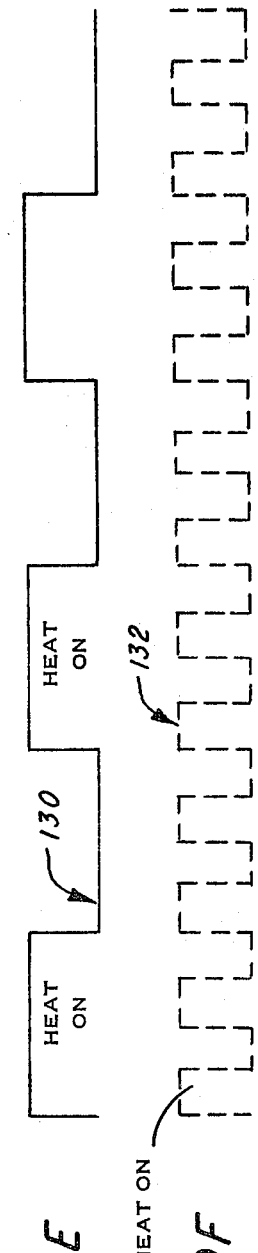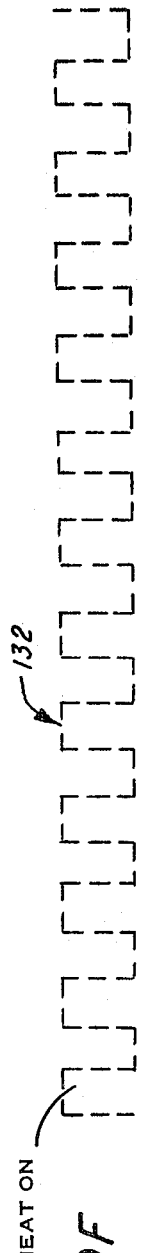

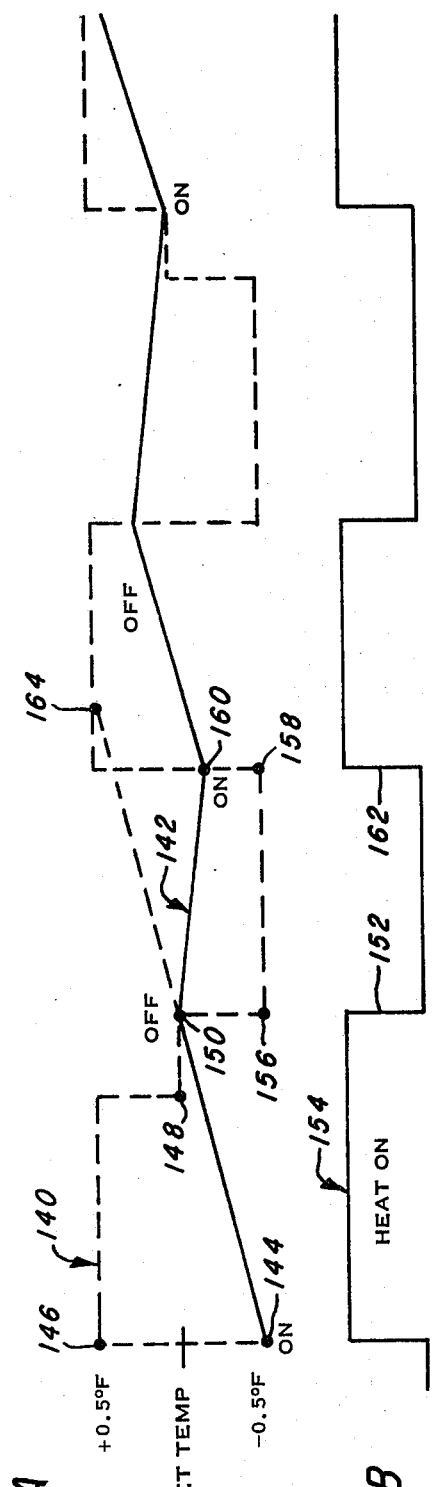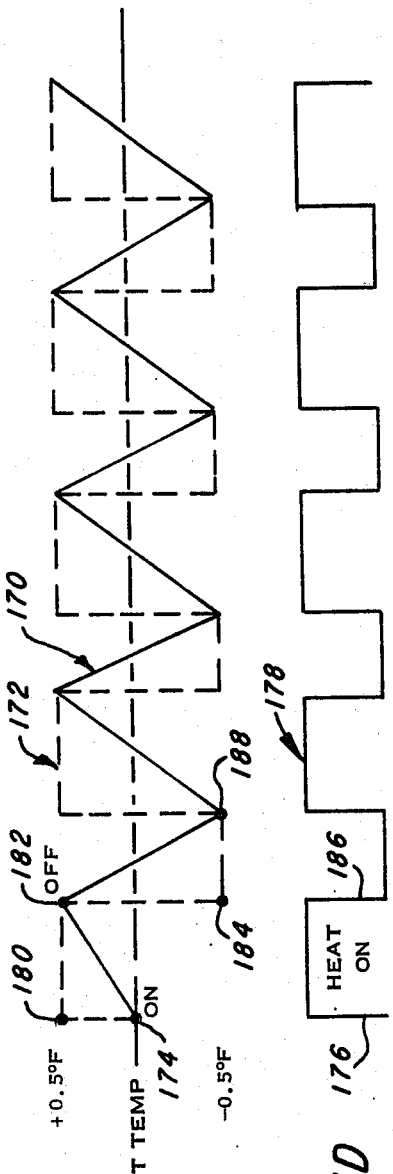

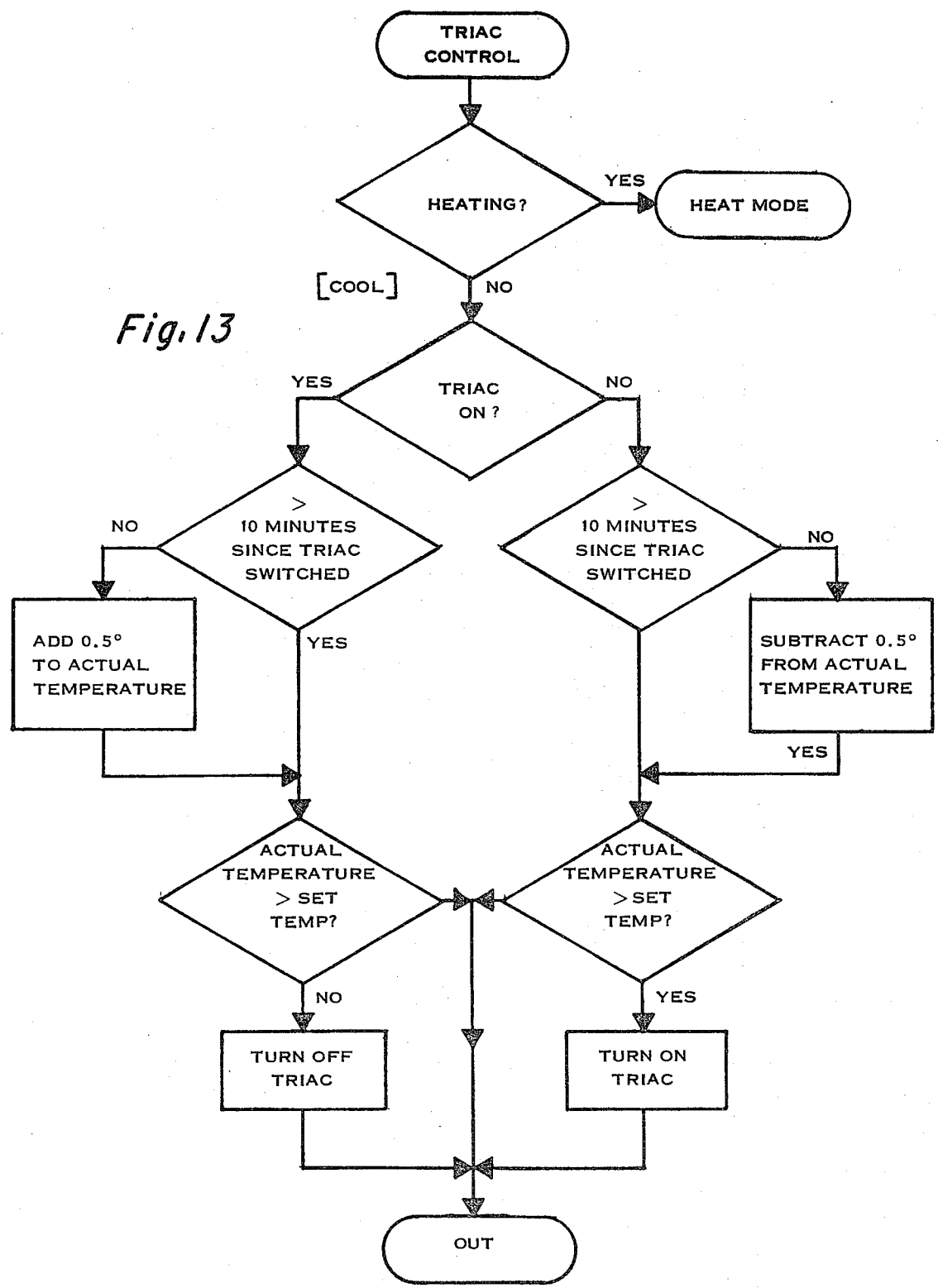

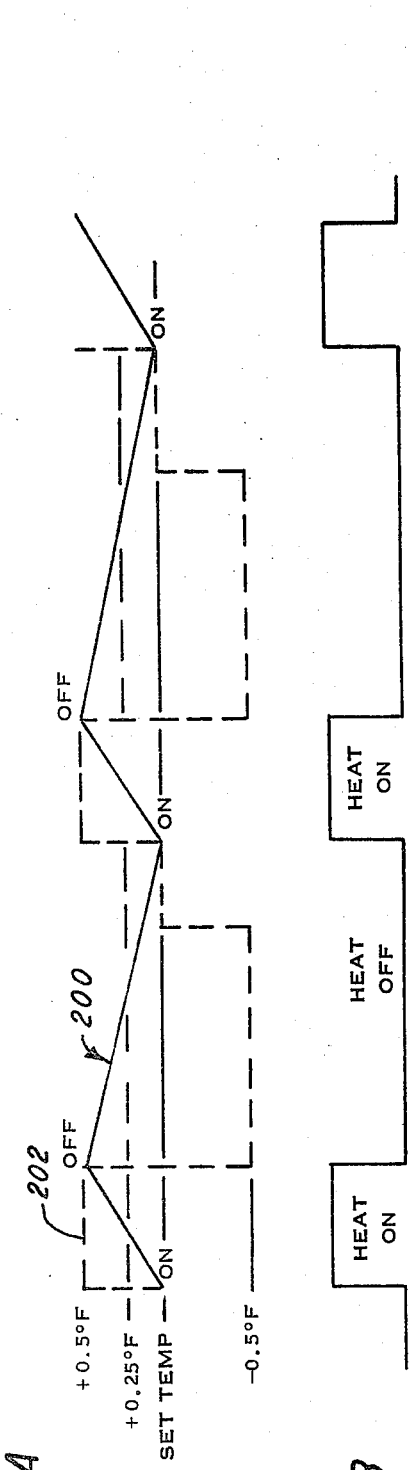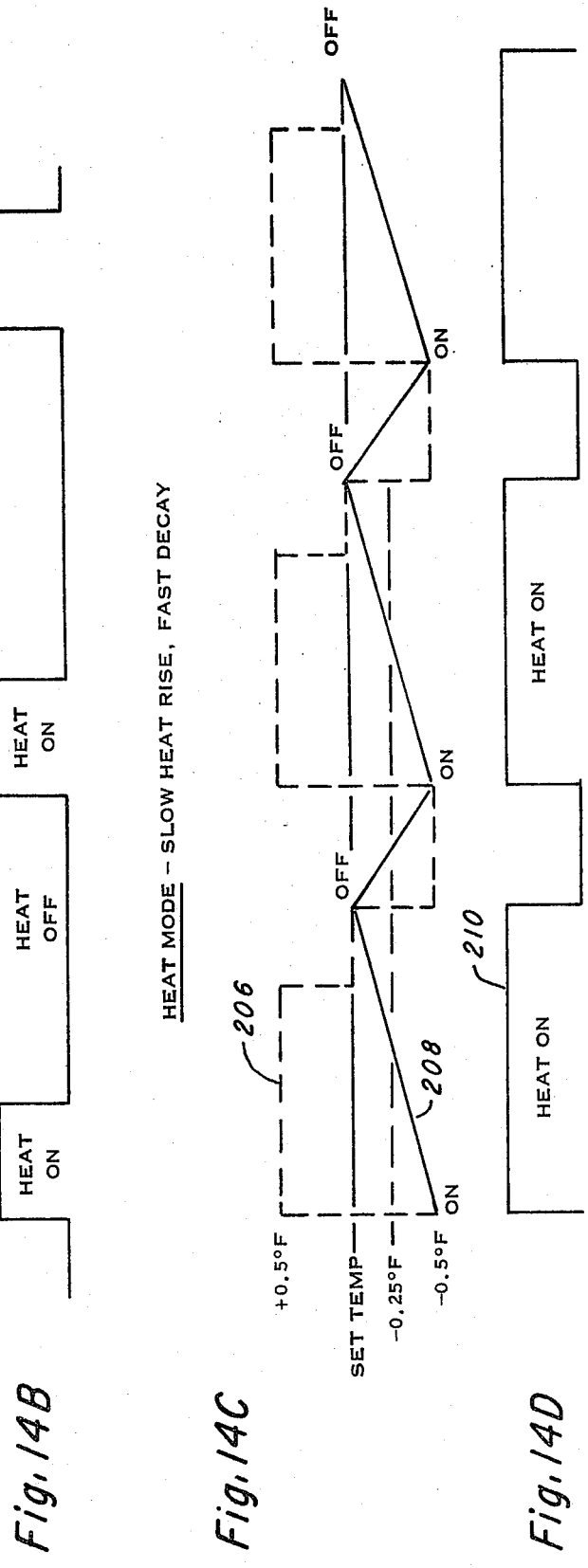

ELECTRONICALLY CONTROLLED PROGRAMMABLE DIGITAL THERMOSTAT HAVING VARIABLE THRESHOLD HYSTERESIS WITH TIME

This invention relates to thermostats and in particular to programable electronic digital thermostats which have variable hysteresis with time characteristics.

Conventional thermostats employed in the home to control the temperature of an indoor area have generally involved the use of electromechanical devices such as spiral wound bimetallic temperature sensors which expand and contract in response to the ambient temperature of the area. The desired temperature is manually set and the system will control heating and/or cooling to maintain this desired temperature. Both heating and cooling anticipation resistors are often used to interject a known bias into the heating and cooling systems to prevent the system from overshooting the desired temperature and to inject a continuously variable hysteresis into the thermostat.

These conventional systems have several disadvantages. First, only one temperature can be set in, necessitating the user's manually changing the set temperature as desired. This results in wasted energy if the system maintains the same temperature when the space is occupied as when it is unoccupied or during hours when the occupants are asleep. Secondly, the system is often sensitive to small temperature fluctuations, such as might occur when a door is momentarily opened, which causes the system to be activated unnecessarily and more often than needed. Thirdly, the anticipation resistors provide heating and/or cooling bias based on the heating and/or cooling duty cycles rather than the actual rate of change of the ambient temperature during heating and cooling operations. Accordingly, the system may maintain a temperature that is uncomfortably low or high. For example, under mild conditions in the summertime when the cooling system duty cycle is lower than normal, the cooling anticipation resistor exerts a heat bias which exposes the sensor to a temperature that is higher than the actual temperature of the cooled area. This reduces the effective set point and causes the system to run more than is needed and the temperature to be lower than desired. This is commonly known as "droop" and is large in bimetallic thermostats, typically between 3° F. and 8° F. In other words, "droop" is defined as the lowering of the thermostat cut-in or turn-on point as the percentage of "on" time increases.

The time lag between the temperature change in a house and the change of temperature of the thermostat varys greatly between different houses and different heating and cooling systems. The maximum cycle rate of a heating system should be 6 to 7 cycles per hour. Cycle rate of an air conditioner should be 3 to 4 times per hour. If a small fixed hysteresis is set to accommodate a slow responding system then the same thermostat in a fast responding system would cycle much too fast and wear out the equipment. If the hysteresis is made large so a fast responding house does not cycle too fast then a slow responding system would not cycle enough which would cause the house to be humid or stuffy.

Thermostats which incorporate anticipation resistors have a continuously variable threshold hysteresis with time, primarily with an exponentially decaying characteristic; the inherent hysteresis in a bimetallic thermostat is relatively large, in the range of 5° F. to 10° F.

With the present emphasis on energy conservation, the need for a "smart", inexpensive thermostat which is programmable to maintain desired temperatures during selected time periods so as to minimize energy consumption is widely recognized.

It is therefore one object of the present invention to provide an improved, inexpensive thermostat system for controlling the temperature of an indoor area while minimizing the amount of energy used.

It is another object of the invention to provide an electronic digital thermostat system which is programmable for automatically maintaining desired ambient temperatures in a given area during selected time periods and which displays desired parameters of time and temperature.

It is an object of the present invention to provide an electronic digital thermostat which controls the range of acceptable cycling of the heating and air conditioning systems.

It is another object of the present invention to provide an electronic digital thermostat which has a hysteresis which is variable with time.

Another object of the present invention is to provide an electronic digital thermostat which eliminates the need for anticipation cooling and heating resistors.

Another object of the present invention is to provide an electronic digital thermostat whose threshold hysteresis characteristic may be varied with minimal modifications to the thermostat.

Another object of the present invention is to provide an electronic digital thermostat which minimizes droop.

Another object of the invention is to provide an electronic digital thermostat whose hysteresis and droop characteristics are repeatable during manufacturing from thermostat to thermostat.

It is a further object of the invention to provide an electronic thermostat system which operates only when necessary and does not react to transient temperature fluctuations and which anticipates reaching the desired ambient temperature so as to prevent wasteful overshooting of the desired temperature.

It is still a further object of the invention to provide an electronic thermostat system which can be controlled by a single chip semiconductor digital processor.

These and other objects are accomplished in accordance with the present invention which provides an electronic programmable wall thermostat system, similar to that disclosed in U.S. patent application Ser. No. 970,019 filed Dec. 18, 1978, entitled "Electronically Controlled Programmable Digital Thermostat" and assigned to the same assignee as the present invention, for controlling the heating and cooling systems supplying a given indoor area. The thermostat system is electrically coupled to the fan, heating and cooling systems and to an AC power supply for the operation thereof. The heart of the system is a programmable digital processor with a ROM containing a permanently stored instruction set and a RAM which stores coded instructions being processed by the digital processor. Coded instructions are entered through a keyboard data entry means having a plurality of keys. A temperature sensing means senses the ambient temperature of the heated and/or cooled space; an analog to digital converter transforms the analog temperature indication to a digital indication and transmits a digital signal indicative thereof to the digital processor. The digital processor responds to the digital signal and to the coded instructions stored in the RAM to selectively gate a controllable switch means such as a triac, which activates and/or deactivates the fan, heating and cooling systems in response thereto in dependence upon the state of a plurality of mode switches, thereby controlling the temperature of the indoor area in a sequence dictated by the instruction set permanently stored in the ROM. Also stored in the ROM as fixed permanently programmed firmware is a routine for varying the hysteresis of the thermostat in discrete steps with time. Each time the triac changes state, the hysteresis characteristic changes alternately between a positive and negative value around the set point or desired ambient temperature of the thermostat. This may be accomplished with firmware or independent discrete logic circuitry. The thermostat system is programmable to automatically maintain ambient temperatures desired during selected time periods. It is programmable for automatic shutdown or setback during periods when the heated and/or cooled space is unoccupied or when activity therein is minimal such as during sleeping hours. It is also operable in a manual mode to maintain a particular temperature setting continuously. The system also includes a 60 Hz oscillator for timekeeping functions.

In a preferred embodiment, the thermostat system contains an LED display comprising four digits for displaying desired parameters of time and temperature and characters for displaying the days of the week and morning/afternoon. The temperature sensing means includes at least one sensor means, the electrical resistance of which varies with the ambient temperature. As a further feature, the ROM is programmed to allow the heating and cooling systems to remain in their present states of deactivation or activation for at least three minutes before they are again activated or deactivated by the digital processor.

In another embodiment, the digital processor comprises a single chip digital processor of the type heretofore generally used for calculator type operations. To enable a single chip to be used, the keyboard data entry means, display and temperature sensing means are connected to common output terminals of the digital processor and are scanned simultaneously therefrom to minimize the number of electrical connections required for control. A silicon spreading resistor is employed as a temperature sensor, thereby enabling larger resistances to be obtained with a low cost, thin planar configuration. As an additional feature, a backup bimetallic temperature sensing element is included in the event of failure of the main temperature monitoring system. The bimetallic sensor is set to activate the heating system when the temperature drops below a selected threshold level such as 40° F. A battery power supply is also included as a backup to supply DC power to the digital processor in the event of failure of the system power supply, thus enabling the digital processor to retain the information programmed therein and to continue timekeeping operations.

Still further objects and advantages of the invention will be apparent from the detailed description and claims when read in conjunction with the accompanying drawings wherein:

FIGS. 10a–10f illustrate the heating waveforms for a conventional mechanical thermostat with a large and small fixed hysteresis;

FIGS. 11a–11d illustrate the waveforms of a thermostat having a variable hysteresis and located in a house having different heating characteristics;

FIGS. 12 and 13 illustrate the flow charts for the heat and cool mode to generate the variable threshold hysteresis characteristic;

FIGS. 14a–14d illustrate the reduction in droop achieved by using a thermostat according to the present invention.

DETAILED DESCRIPTION OF A FIRST EMBODIMENT

Figure 1:
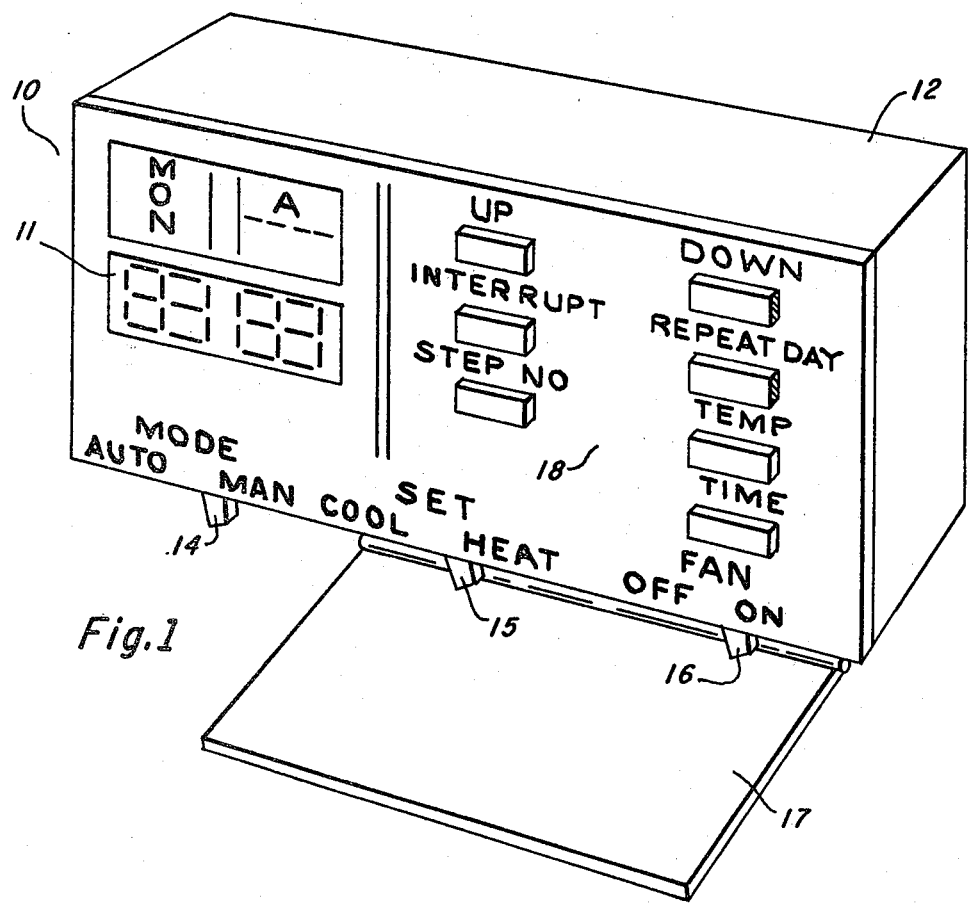
FIG. 1 is a perspective view of a first embodiment of a thermostat system in accordance with the present invention.

FIG. 1 illustrates one preferred embodiment of a thermostat 10 having a box-shaped housing 12. Display 11 is an LED display which comprises four digits for displaying time and temperature parameters and backlighted indications for the day of the week and morning/afternoon (A/P). In the present embodiment, the four digit display is not continuous; the display is manually activated by pressing the TEMP keys and/or the TIME keys to display actual and programmed times and temperatures. Once activated, display 11 remains on for a selected length of time, typically 10 seconds. Mode switches 14, 15 and 16 are manually settable for thermostat 10 to operate in the automatic or manual mode, the cool or heat mode and the fan on continuous or fan automatic mode, respectively. Door 17, which is shown in an open position, covers keyboard 18, during normal operation. Access to keyboard 18 is easily achieved by opening door 17, which is hingedly attached to housing 12. Keyboard 18 comprises a plurality of keyswitches for setting time and temperature functions including means for programming thermostat 10 for automatic operation during selected time cycles.

Figure 2:
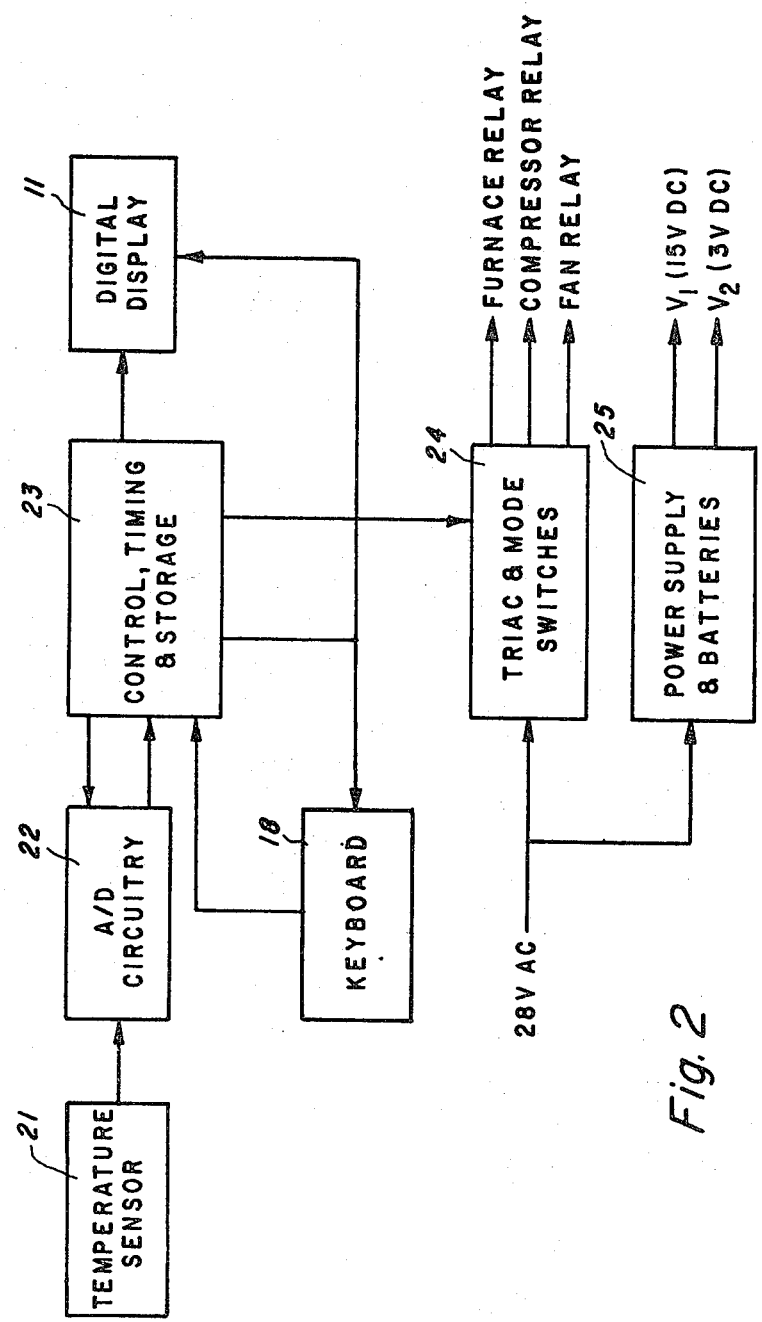
FIG. 2 is a block diagram of the thermostat control system and power supply.

Referring now to FIG. 2, a block diagram of the thermostat system is illustrated. A temperature sensor such as a sensor 21, the electrical resistance of which varies linearly with temperature, senses the ambient temperature of the area in which temperature is being controlled. Responsive to temperature sensor 21, analog to digital (A/D) converter 22 continually sends digital coded indications of temperature to digital circuit means or digital processor 23 when interrogated by processor 23. Processor 23 performs control, timekeeping and information storage functions and is programmable for desired temperatures and selected times via inputs from keyboard 18.

In accordance with its permanently stored program instruction set, processor 23 selectively activates switching circuit 24, which includes a triac and mode switches 15 and 16 as shown in FIG. 1. When activated, the triac drives AC voltage to the air conditioning relay, furnace relay and fan relay in dependence upon the state of mode switches 15 and 16, thereby controlling heating and cooling to maintain the desired temperature. Rectifying power supply means 24 receives an AC input and provides DC voltage $V_1$ to operate digital processor 23 and DC voltage $V_2$ to drive display 11. Processor 23 selectively scans keyboard 18 and display 11 and activates display 11 to display selected parameters of time and temperature in accordance with coded instructions from keyboard 18.

Figure 3:
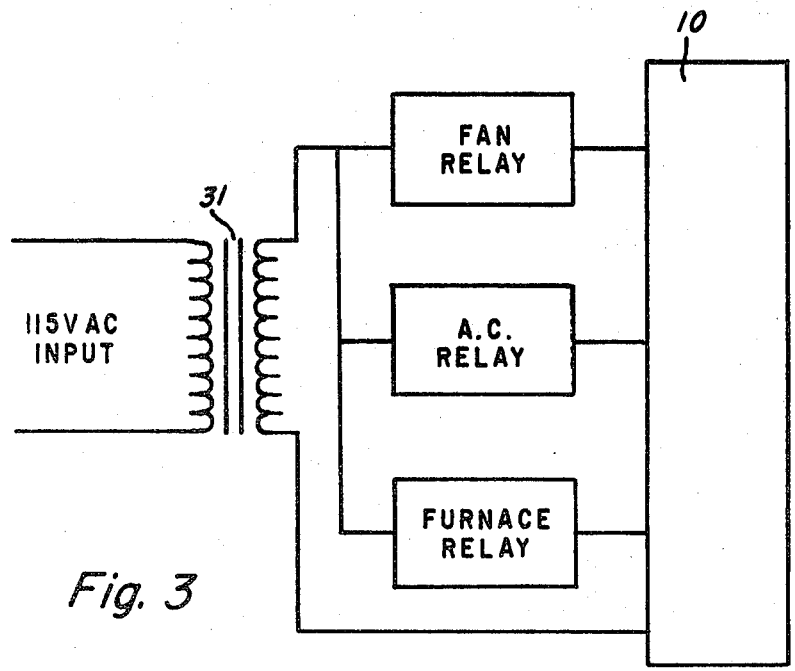
FIG. 3 is a circuit diagram showing the connection of the thermostat system to an AC power source.

FIG. 3 shows thermostat 10 connected to the 4-wire heating, air conditioning, fan and AC power supply connection wires commonly provided for home heating and air conditioning systems. Step-down transformer 31 reduces the AC line voltage to approximately 24VAC. Thus thermostat 10 is directly substitutable for the standard electromechanical thermostat without the need for additional connection circuitry.

Figure 4A:
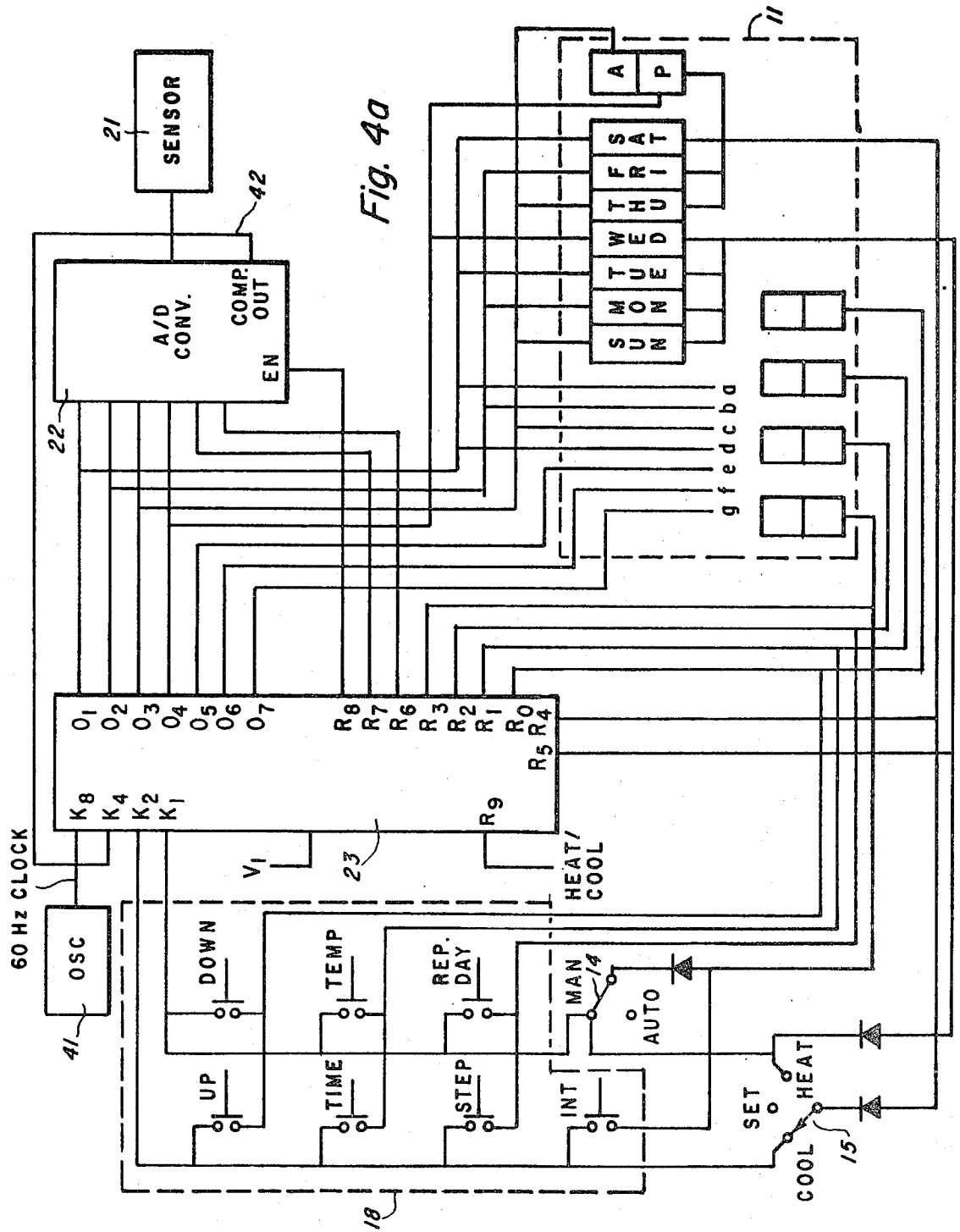
FIG. 4a is a circuit diagram of the thermostat control system embodied in the thermostat of FIG. 1.
Figure 4B:
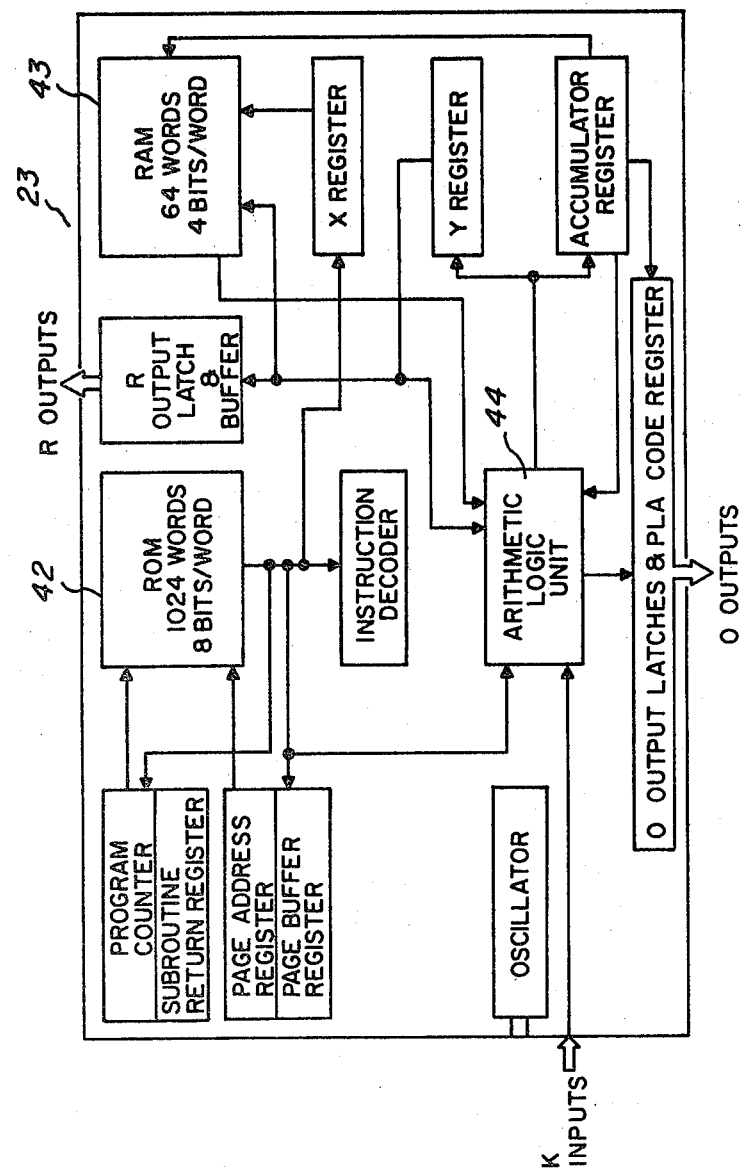
FIG. 4b is a block diagram of the TMS1100 digital processor.

FIG. 4a is a circuit diagram of the thermostat control system contained within housing 12. The heart of the system is digital processor 23 which includes a microprocessor, preferably a single chip semiconductor digital processor of the TMS1100 microcomputer type, which is manufactured and sold as a standard product by Texas Instruments Incorporated. Referring also to FIG. 4b, digital processor 23 includes a ROM 42 in which is permanently stored a full instruction set for controlling the sequence of operations of thermostat 10, a RAM 43 for storing coded information while the information is being processed, and an arithmetic logic unit 44 for performing arithmetic and logic operations. The TMS1100 includes the ROM, RAM and ALU on the single semiconductor chip. The instruction codes stored in the ROM of digital processor 23 are shown in Table I.

ROM 42 has programmed thereon a known delay time period (e.g., three minutes) such that digital processor 23 will not change the state of (i.e. activate or deactivate) the heating and/or cooling systems until they have remained in their present states of deactivation or activation for at least the delay time period, which is typically three minutes in duration. This feature eliminates rapid cycling of the heating and cooling systems and prolongs system life. A hysteresis feature is built in to give the system some leeway in maintaining the desired temperature and to prevent the system from reacting unnecessarily to small changes of ambient temperature, thus conserving precious energy. This hysteresis feature will be described in detail as set forth below. This eliminates the need for anticipation cooling and heating resistors, which exert a temperature bias on the system, but may cause the system to maintain the temperature uncomfortably low or high during non-typical weather conditions.

Coded temperature and time information is entered into digital processor 23 and stored in a plurality of registers in RAM 43 via the key switches of keyboard 18. By pressing selected key switches, desired temperatures and selected times of a time cycle are stored in digital processor 23 thereby programming digital processor 23 for temperature control in the automatic mode. Digital processor 23 automatically controls the heating and cooling systems to maintain the desired temperatures in accordance with the time sequence programmed therein. Alternatively, the system is operable in a manual mode wherein digital processor 23 will continuously maintain a particular temperature that is programmed in until it receives further instructions.

Referring to FIG. 4a, digital processor 23 controls the operation of the system by transmitting electrical signals via output terminals R0–R9 and 01–07 and receiving input signals via input terminals K1 and K2. Digital processor 23 also has a 60 Hz clocking signal applied to input terminal K8, from oscillator 41 to keep track of real time and a DC input of approximately 15 volts. Display 11 and keyboard 18 (both of which are delineated by dotted lines) and A/D converter 22 are selectively controlled and scanned from common output terminals of digital processor 23 to minimize the number of electrical connections necessary and permit the use of a single semiconductor chip. Output terminals R0–R3 selectively scan the four digits of display 11 in sequence and output terminals 01–07 activate selected ones of segments a through g on each digit in accordance with the scanned sequence. Output terminals R0–R8 also scan the key-switches of keyboard 18 and mode switch 14 and input signals indicative of the positions of these switches are received via input terminals K1 and K2. Similarly, output terminals R4 and R5 scan mode switch 15 and the day of the week and morning/afternoon (A/P) indications of display 11. Output terminals 01–04 activate the days of the week and A/P displays in accordance with the scanned sequence. Output terminals R6 and R7 and 01–04 scan A/D converter 22, which is enabled by a signal via output terminal R8. A/D converter 22 is not continuously activated because the heat buildup within temperature sensor 21 would result in false temperature readings.

A/D converter 22 includes a resistance bridge (not shown) and a comparator (not shown) which compares the voltages on each side of the bridge and transmits a comparator output signal 42 when the bridge becomes balanced to input terminal K4 of digital processor 23. The bridge includes temperature sensor 21 and a resistance ladder having resistors whose resistance values are binary coded. These resistors are selectively switched on by digital processor 23 in a sequence corresponding to binary coded 1° F. step increments in the ambient temperature until the bridge is balanced, whereupon comparator output 42 changes state (i.e. changes from a logic "1" to "0" or vice versa) thereby informing digital processor 23 that the ambient temperature as measured by temperature sensor 21 has been reached. Digital processor 23 compares the ambient temperature and real time with the coded time and temperature instructions stored in RAM 43 and controls the heating and cooling systems to maintain the desired ambient temperatures in accordance with the stored instructions.

Figure 5:
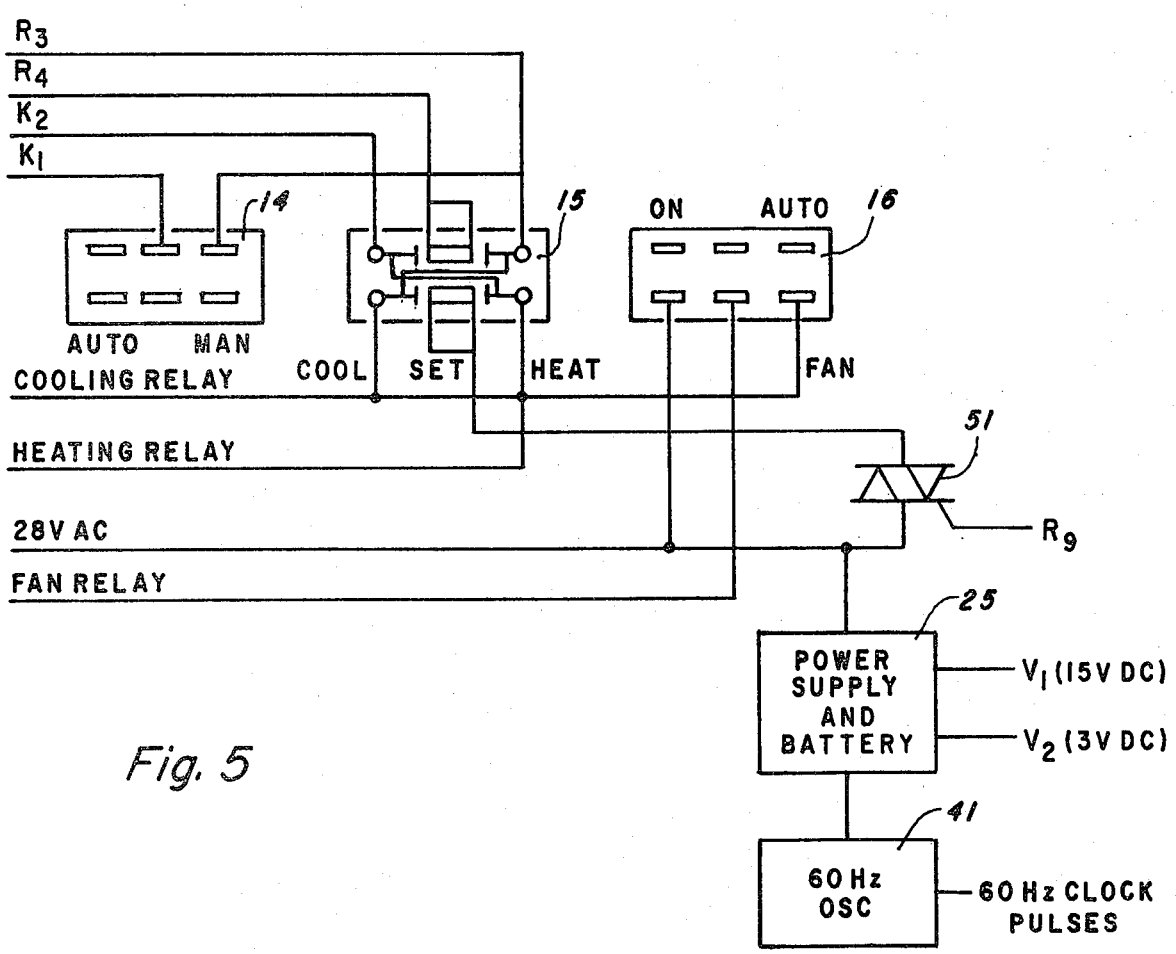
FIG. 5 is a circuit diagram of the heating, cooling and fan relay systems and the thermostat switches.

Digital processor 23 controls the activation of triac 51, shown in FIG. 5. To activate the heating and/or cooling systems, a gating signal via output terminal R9 turns on triac 51, which drives AC current to the fan, air conditioning and/or heating relays in dependence upon the state of mode switches 14, 15, and 16. Mode switches 14, 15 and 16 are, for example, double pole multiple throw slide switches, which are manually settable. Fan switch 16 is settable in the ON or AUTO positions. If fan switch 16 is set in the ON position, AC current bypasses triac 51 and goes directly to the fan relay thereby activating the fan continuously regardless of whether the heating or cooling system is activated. If fan switch 16 is in the AUTO position, the fan will be automatically activated in synchronism with the heating and/or cooling systems. For example, if mode switch 15 is in the COOL position, triac 51, when triggered by digital processor 23, drives AC current to the fan and air conditioning relays. Similarly, mode switches 14 and 15 are settable to operate in an automatic or manual mode and in a cooling or heating mode, respectively. The SET position of switch 15 represents the off position and permits the system to be user programmed. Digital processor 23 determines the positions of switches 14 and 15 by scanning the switches from output terminals R3 and R4 and receiving information on input terminals K1 and K2.

As previously mentioned, the standard 4-wire thermostat connection is utilized to facilitate installation. To enable the 4-wire connection scheme to be used, the heating relay and cooling relay wires are connected so that a small trickle current, which is insufficient to activate either system, flows through the heating relay when mode switch 15 is in the COOL position and flows through the cooling relay when mode switch 15 is in the heat position. The thermostat system power supply receives AC voltage from the 24 volt AC supply and reduces and rectifies the voltage to provide a DC voltage input $V_1$ of approximately 15 volts for the TMS1100 microcomputer comprising digital processor 23 and a DC voltage $V_2$ of approximately 3 volts to drive LED display 11. Power supply means 25 also supplies power to oscillator 41 which is synchronized with the 60 Hz AC line input to provide 60 Hz clock pulses to digital processor 23. Power supply means 25 further includes a battery which functions as a backup power supply for digital processor 23 in the event of failure of the main system power supply. Power supplied from the battery enables digital processor 23 to retain any user supplied information programmed therein and to continue keeping real time.

VARIABLE THRESHOLD HYSTERESIS MODE OF OPERATION

As mentioned earlier, a hysteresis feature if built in the thermostat according to the present invention to give the system leeway in maintaining the desired ambient temperature and to prevent the system from reacting unnecessarily to small changes of ambient temperature, thus conserving energy. This electronic thermostat system eliminates the need for anticipation cooling and heating resistors, which, in prior art thermostats, exert a temperature bias on the system, but may cause the system to maintain the temperature uncomfortably low or high during non-typical weather conditions. The time lag between the temperature change in a house and a change in temperature of the thermostat varies greatly between different houses and different heating and cooling systems. The maximum cycle rate of a heating system should be in the range of five to eight cycles per hour. Cycle rate of a cooling system should be in the range of two to five cycles per hour. If a small fixed hysteresis is set to accommodate a slow responding system, then the same thermostat in a fast responding system would cycle too fast and wear out the equipment. If the hysteresis is made large so a fast responding house does not cycle too fast, then a slow responding system would not cycle enough which would cause the house to be humid and stuffy. This can be seen more clearly by referring to FIGS. 10a–10f.

FIG. 10a represents the waveforms for a conventional mechanical thermostat which has a large threshold hysteresis. For purposes of explanation, the heating mode will be assumed although it will be obvious to one skilled in the art that the same principles apply for the cooling mode. FIG. 10a illustrates a thermostat having a threshold hysteresis which is relatively large and which is fixed around the set temperature or desired ambient temperature of a thermostat inserted by the user. For purposes of discussion, set point and desired ambient temperature will be used interchangably. Waveform 100 represents room temperature and illustrates a thermostat which is turned on at point 102 and the heat builds up in the house until its temperature reaches the threshold temperature at point 104 at which point in time the heating system is deactivated. Waveform 106 in FIG. 10c illustrates the on/off time (duty cycle) for the heating system illustrated in FIG. 10a; it illustrates a thermostat coming on at the time the house temperature reaches the threshold temperature at point 102 and turning off when the house temperature reaches the threshold temperature at point 104. When the heating system is turned off, the house begins to cool and accordingly the temperature begins to drop as is shown in waveform 100 until it reaches point 108. At point 108, the house temperature equals the lower threshold temperature and the heating system is again activated. This cycle is repeated. In FIG. 10a, waveform 110 illustrates a slower responding house in which the heat is turned on at point 102 but requires a substantially longer period of time for the heating system to heat the house to the point at which the heat is deactivated as illustrated at point 112. FIG. 10b illustrates waveform 114 where the heating system is turned on at a point corresponding to point 102 and turned off at point 112. As can be seen, with the thermostat in a house having characteristics of waveform 110, the cycle rate is very slow which would cause the house to be humid and stuffy.

As mentioned earlier, a possible solution would be to use a thermostat with a small, fixed hysteresis to thereby accommodate a slow responding system. This is illustrated in FIG. 10d wherein the threshold hysteresis is shown as being very small. Waveform 116 in FIG. 10d corresponds to waveform 100 in FIG. 10a, each having the same slopes; that is, the house has the same heating characteristics and the heat builds up at the same rate and decays at the same rate. Waveform 118 in FIG. 10d corresponds to waveform 110 in FIG. 10a. As can be seen from FIG. 10d, the thermostat and house having the characteristics illustrated as waveform 116 is turned on at point 120 and turned off at point 122 and then turned back on at point 124. This can be seen more clearly by referring to FIG. 10f which shows the pulse generated by the heating system turning on and off. Waveform 118 causes the thermostat to turn on at point 120 and turn off at point 126 and then turning back on at point 128. The corresponding heating pulses for waveform 118 is illustrated in FIG. 10e as waveform 130. As can be seen in comparing the waveform 114 in FIG. 10b and the waveform 130 in FIG. 10e, in a slow responding system if the threshold hysteresis is made smaller, to accommodate a slow responding system, the heating system will cycle more quickly. However, if that same thermostat (with a small threshold hysteresis) is placed in a fast responding house such as that illustrated in FIG. 10d by waveform 116, then the same thermostat would cycle too fast as shown in FIG. 10f by waveform 132.

Prior art mechanical thermostats attempted to solve this problem of utilizing fixed threshold hysteresis temperatures by utilizing heating and cooling anticipation resistors. Heat anticipation is the result of building into the thermostat a tiny resistance heater of its own. The heater resistor is wired into the circuit to heat as long as the thermostat contacts are closed. It is placed so that its heat will flow directly into the thermostat actuator, with as little effect as possible on the surrounding air. When the thermostat calls for heat, the anticipator resistor also heats and very quickly begins to increase the temperature of the thermostat element above that of the surrounding air. It is possible for the anticipator heat to raise the temperature of the thermostat actuator enough to overcome its built-in hysteresis. In other words, a thermostat equipped with heat anticipation could call for heat, turning on the heating system, and open its contact from the heat of the anticipator with very little increase in the temperature around the thermostat. The hysteresis, therefor, varies in these mechanical thermostats usually in a continuous, exponential manner. However these types of thermostats characteristically have a large "droop" problem. Droop is the name given to a lowering of the thermostat cut-in point as the percentage of "on" time increases, (i.e., higher duty cycle). As mentioned previously, in using the heat anticipation resistors, only enough heat is added to raise the temperature of the thermostat actuator without affecting the temperature of its surrounding. However, if the thermostat is required to call for heat most of the time (i.e., a high duty cycle), the amount of false heat delivered by the heat anticipator resistor inside the thermostat will be increased materially. When the "on" periods are long, the heat from the anticipator resistor raises the temperature of the entire thermostat above room temperature which, in effect, lowers the actual set point (or desired ambient temperature) of the thermostat (for example, from a set point of 75 degrees to 68 degrees). This problem can be lessened by more accurate sizing of the anticipator resistors to the particular space requirements, but this means that an installer has to individually size the resistors for each new indoor area where a thermostat is to be installed. This obviously is not a desirable or efficient method of operation.

In order to avoid the problems associated with a fixed hysteresis as described in connection with FIGS. 10a and 10d, the electronic digital programmable thermostat according to the present invention has a threshold hysteresis temperature which is variable with time in discrete steps around the desired ambient temperature or set point. According to the present invention, in a fast responding system, the threshold hysteresis temperature is large which slows down the cycle rate by allowing the temperature swing of the system to increase. In a slow responding system, the hysteresis goes to a very small value after a given time; this forces the system to cycle faster than it would normally.

The following chart illustrates one embodiment of the variable threshold hysteresis temperature utilized in the electronic programmable thermostat 10.

CHART

| VARIABLE THRESHOLD HYSTERESIS | | TIME | THRESHOLD (°F.) |
|---|---|---|---|
| HEAT | TRIAC ON | 0–6 min | SET + .5° |
| | | 6 min.–∞ | SET + 0° |
| | TRIAC OFF | 0–6 min. | SET − .5° |
| | | 6 min.–∞ | SET − 0° |
| COOL | TRIAC ON | 0–10 min. | SET − .5° |
| | | 10 min.–∞ | SET − 0° |
| | TRIAC OFF | 0–10 min. | SET + .5° |
| | | 10 min.–∞ | SET + 0° |

In the heat mode, the threshold hysteresis is at the set temperature plus 0.5 degrees for a maximum time period of six minutes. After six minutes, the threshold temperature is reduced to the set temperature. If the room temperature reaches the threshold temperature during the first six minute time period, a signal will be produced by data processor 23 in FIG. 4a on output line $R_9$ to gate triac 51 (FIG. 5) "on". If the room temperature does not reach the set temperature +0.5° during the six minute time period, the threshold hysteresis temperature will decrease in a discrete step to equal the set temperature. When the room temperature equals the set or threshold hysteresis temperature (which are equal at this point), triac 51 will be turned on.

As soon as the triac 51 is activated, the threshold hysteresis is changed to equal the set temperature −0.5° and remains at that value for six minutes. After the six minute time period, the threshold hysteresis is increased to equal the set temperature. If the room temperature equals the set temperature −0.5° during the first six minutes, triac 51 will then be activated; however if the room temperature does not reach the set temperature −0.5° during the six minute time period, then the threshold hysteresis changes in a discrete step to equal the set temperature. When the room temperature then equals the set temperature, a signal will be produced by processor 23 which will gate triac 51 on. This cycle is repeated.

In the cool mode, it will be noted from the chart that the threshold hysteresis, in essence, is a mirror image of the threshold hysteresis for the heat mode. Also, it will be noted that the time periods have been changed from six minutes to ten minutes. The longer time period for the cool mode is desired in order to insure that the cooling system cycles fewer times per hour than the heating system (preferably in the order of two to five times per hour).

FIG. 11 illustrates a series of waveform for the heat mode for a house having different heating characteristics. Referring now to FIGS. 11a and 11b, there is illustrated for the heat mode a house which has slow heat rise and slow heat decay characteristics. Dotted waveform 140 represents the hysteresis threshold temperature which is described in the above-mention Chart. The solid line waveform 142 represents the room temperature. At point 144, the heating system is turned on and the room temperature begins to increase (as shown by the rising portion of waveform 142). When triac 51 turns on at point 144, the threshold hysteresis curve immediately goes to a first value equal to the set temperature +0.5°; this is shown at point 146. The hysteresis threshold temperature remains at this first value for a fixed period of time (equal to six minutes) at which time it is reduced to the set temperature as illustrated at point 148. When the room temperature equals the threshold temperature at point 150, processor 23 generates an output signal on line $R_9$ to triac 51 turning the heating system off, as illustrated by the falling edge 152 of waveform 154 in FIG. 11b. When the triac is deactivated, the threshold hysteresis changes immediately to a value of opposite polarity from the value when said triac was turned on, namely the set temperature $-0.5°$ as shown at point 156 in FIG. 11a. The threshold hysteresis curve 140 will remain at point 156 for a predetermined time period (six minutes) unless the room temperature equals the threshold hysteresis temperature during that six minute period. As waveform 140 is changing its value from point 158 to go to zero, at point 160 the threshold hysteresis temperature equals the room temperature causing digital processor 23 to generate a signal via line $R_9$ to triac 51 thereby activating the heating system. The rising edge 162 of waveform 154 in FIG. 11b provides the signal to the gate of triac 51 to turn the heating system on.

Thus it can be seen from FIGS. 11a and 11b that with a variable threshold hysteresis characteristic according to the present invention, in a slow responding system, the hysteresis goes to a very small value after a given time. In other words, with the variable threshold hysteresis, the heating system is turning off and on over an effective hysteresis temperature range of approximately 0.3°. This forces the heating system to cycle faster than it would normally. In other words, if a fixed hysteresis characteristic were used such as that illustrated in FIG. 10, the heating system would not turn off until point 164 in FIG. 11a.

FIGS. 11c and 11d illustrate the threshold hysteresis characteristic for a thermostat according to the present invention in a house having a fast heat rise and fast decay characteristic. In FIG. 11c, solid waveform 170 represents the room temperature while dotted waveform 172 represents the variable hysteresis threshold temperature according to the present invention. At point 174, the threshold hysteresis curve and the room temperature are equal and the heating system is turned on as illustrated in FIG. 11d by the rising edge 176 of waveform 178 which represents the output $R_9$ of processor 23 (FIG. 4a) which gates triac 51 (FIG. 5) to activate and deactivate the heating system. When the triac 51 is activated, the threshold characteristic 172 immediately goes to the set temperature $+0.5°$ as shown at point 180. The threshold hysteresis temperature remains at this first value for a predetermined time (six minutes) unless the room temperature equals this threshold hysteresis value prior to this six minute period elapsing. This is exactly what occurs with the fast heat rise characteristic such that at point 182 the room temperature equals the threshold hysteresis temperature causing the heating system to be turned off and the threshold hysteresis temperature to immediately go to the set temperature $-0.5°$ as shown at point 184. The falling edge 186 of waveform 178 insures that the triac 51 and the heating system is turned off. Once again, the threshold hysteresis temperature will remain at the set temperature $-0.5°$ for six minutes unless the room temperature reaches this value before it changes; this is what happens since the room temperature exhibits a fast decay characteristic and equals the threshold hysteresis temperature at point 188, turning on the heating system. This heating cycle continues.

As will be noted, with the variable hysteresis characteristic employed according to the present invention, in a fast responding system the hysteresis (or effective temperature control) is approximately one degree. That is, the temperature variation around the set temperature is one degree. In other words, if a fixed small hysteresis were used (such as the 0.3° hysteresis obtainable in FIGS. 11a and 11b), it is obvious that the heating system having the room temperature characteristics of waveform 170 in FIG. 11c would cause the heating system to cycle on much too rapidly. Accordingly the variable threshold hysteresis characteristic described in the above Chart and with reference to FIGS. 11a–11d allows a thermostat to accommodate both a fast responding and slow responding heating and cooling system.

Figure 12:
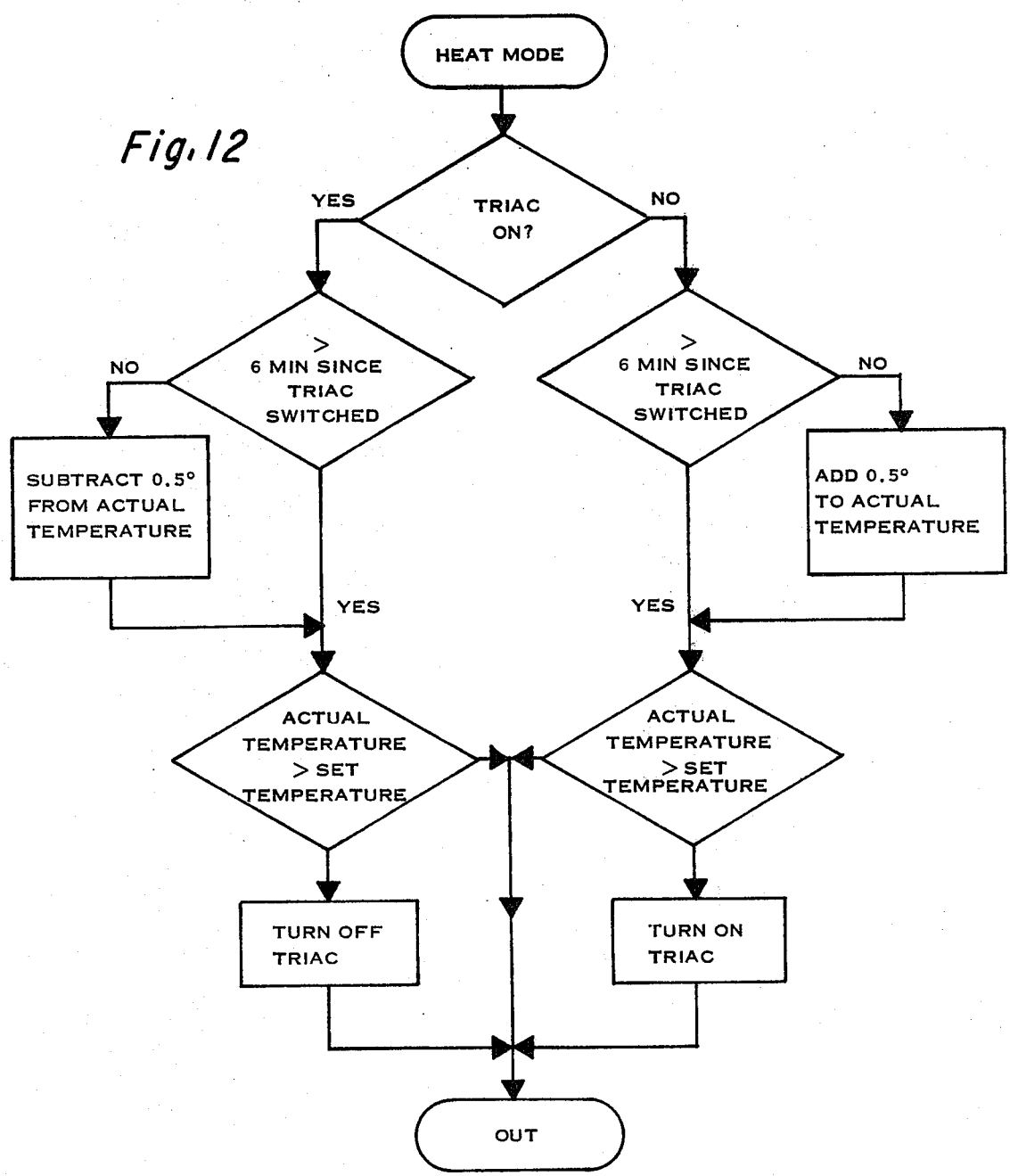

The circuitry for generating the variable threshold hysteresis and for comparing the threshold hysteresis temperature with the room temperature can either be accomplished with digital processor 23 or logic circuitry (in MOS or discrete form) independent of digital processor 23. The generation of the threshold hysteresis temperature characteristic and comparison can be accomplished by ROM 42 of digital processor 23 illustrated in FIG. 4b. FIGS. 12 and 13 illustrate the flow charts for the heat and cool modes, respectively, required to provide the threshold hysteresis characteristic outlined in the Chart above. The program can be fixed in ROM 42 to implement the threshold hysteresis routines just described and set forth in FIGS. 12 and 13. The hysteresis algorithm/source code for ROM 42 is provided in Table III attached hereto.

FIGS. 14a–14d illustrate the reduction in "droop" achieved by using the variable threshold hysteresis characteristic with the electronically controlled programmable digital thermostat 10. FIGS. 14a and 14b are illustrative of the thermostat when it is in the heat mode and the area to be heated has a fast heat rise and slow decay characteristic. Solid waveform 200 illustrates the room temperature while dotted waveform 202 in FIG. 14a illustrates the variable hysteresis threshold characteristic of thermostat 10. Waveform 204 in FIG. 14b illustrates the duty cycle of the heating system. As will be noted, the hysteresis characteristic is identical to that described in the Chart above and varies 0.5° above and below the set temperature. Waveform 204 in FIG. 14b illustrates a heating system with a relatively low (approximately 20%) duty cycle. With this low duty cycle and particular characteristics in FIG. 14a, it can be seen that the thermostat 10 is controlling the room temperature between the set temperature and the set temperature $+0.5°$, or at a median temperature of the set temperature $+0.25°$ F.

In contrast, FIGS. 14c and 14d illustrate a thermostat in the heat mode in an area having a slow heat rise and fast decay characteristic. Dotted waveform 206 illustrates the threshold hysteresis characteristic under this condition while solid waveform 208 in FIG. 14c illustrates the variation in room temperature. Waveform 210 in FIG. 14d illustrates the signal on line $R_9$ of processor 23 connected to the gate terminal of triac 51. Waveform 210 shows a high duty cycle (approximately 80% on time) for this particular heating situation. It will be noted that the room temperature waveform 208 varies between the set temperature and the set temperature $-0.5°$ F. Accordingly the thermostat is controlling the room temperature around a median of approximately the set temperature $-0.25°$ F. as shown in FIG. 14c. The droop therefore is a difference between the median temperature shown in FIG. 14a, i.e., set temperature $+0.25°$ minus the median temperature illustrated in FIG. 14c, namely the set temperature −0.25°, resulting in a droop equal to 0.5° F.

Accordingly, it can be seen that the droop for the present thermostat having a variable threshold hysteresis is minimal compared to conventional mechanical thermostats and will therefore control the heating and cooling systems more accurately around the set temperature of the thermostat, thereby providing a more comfortable environment for the user.

Figure 15:
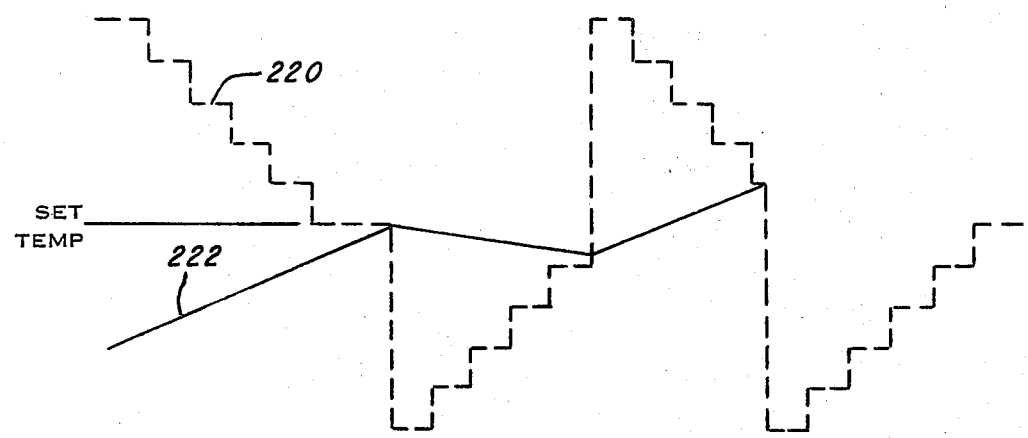
FIG. 15 illustrates an alternate embodiment of a variable threshold hysteresis characteristic.

FIG. 15 illustrates another threshold hysteresis temperature characteristic 220 which can be used in conjunction with the electronic digital programmable thermostat 10. As can be seen, the threshold hysteresis temperature starts at a first value for a fixed period of time and changes in a stairstep manner to a second, third, etc. value unless the ambient room temperature 222 reaches one of said values before such change to said second, third, etc. values which will activate or deactivate the heating and cooling system. When this occurs, the threshold hysteresis temperature changes to a first value of opposite polarity from said first value of desired ambient temperature for a fixed period of time and then changes to a second, third, etc. value of opposite polarity unless the ambient temperature reaches one of these values at which point in time the hysteresis temperature curve reverts back to the first value. Therefore it will be obvious to one skilled in the art that more than one hysteresis sequence can be stored in digital processor 23 and selection means can be incorporated therein which allows the user to select the particular threshold hysteresis sequence that he desires.

Furthermore it will be noted, for example referring to FIG. 11a, that the first value of the threshold hysteresis temperature (point 146) is equal in magnitude and duration to the first value of opposite polarity (point 144). Although the magnitude and duration is described in the Chart above set forth as being the same for the threshold hysteresis temperature when the triac is activated and deactivated, it will be noted that the characteristic for the threshold hysteresis temperature may be different when the triac is activated as contrasted to when it is deactivated. Also, the hysteresis characteristic for the heating cycle is different from the hysteresis for the cooling cycle as evidenced in the same Chart above, namely in the cool cycle the threshold hysteresis characteristic is at plus or minus 0.5° F. for ten minutes versus the six minutes in the heat mode.

As mentioned previously, other means for generating a variable hysteresis can be achieved within the scope of the present invention. For example, variable hysteresis with time can be achieved by having a software controlled time output for heat and another one for cool with a different time output. These digital outputs would be used as positive feedback in the analog temperature circuit to set the hysteresis. The amount of hysteresis would be set with resistors and the time of hysteresis would be determined by the software. The hysteresis would have to be turned off on every other temperature sample so the temperature could be sampled without the effect of hysteresis for display purposes. Then a sample would be made with hysteresis turned on to be used for control purposes.

MODE OF OPERATION OF FIRST EMBODIMENT

Referring again to FIG. 1, the present embodiment of thermostat 10 is programmable via keyboard 18 for up to 15 separate user program instructions during a seven day time cycle. Each program instruction represents a specific temperature desired during a specific time period. For example, thermostat 10 is programmable for automatic temperature setback during periods when the heated and/or cooled space is unoccupied such as during daily working hours on weekdays and during nighttime sleeping hours. Thermostat 10 may also be programmed to bring the ambient temperature back up to a comfortable level when one arrives back home after work or when one rises in the morning. The seven day cycle feature enables a full week of user programmed instructions to be stored in the memory of thermostat 10. The user program will be executed week after week until altered for such as vacations. Different temperature instructions may be stored for different days of the week. For example, on weekends one may wish to keep his home at a comfortable temperature all day long because he will be home all day rather than at a lower or higher temperature which may be acceptable during weekday periods when the home is unoccupied.

To operate thermostat 10, the clock should first be set by moving mode switch 15 to the SET position, which corresponds to the off position of the heating and cooling systems, and code switch 14 to the MANUAL position. The TIME key on keyboard 18 is then depressed and display 11 is set to the correct day of the week and morning or afternoon using slew keys UP and DOWN. Alternatively, a numerical keyboard is substitutable for the slew keys. The TIME key is depressed a second and a third time and the above procedures are repeated to set in the correct hours and minutes, respectively. To start the clock, mode switch 15 is returned to either the HEAT or COOL position.

To operate thermostat 10 in a manual mode, mode switch 15 is moved to the SET position and mode switch 14 to the MANUAL position. The set and actual temperatures will be displayed. The desired temperature is then entered using slew keys UP and DOWN and mode switch 15 is returned to the HEAT or COOL position as desired. Referring to FIGS. 4a and 5, digital processor 23 will selectively switch on triac 51 to activate the heating and/or cooling systems to maintain the desired temperature.

To program thermostat 10 for automatic operation, mode switch 15 is moved to the SET position and mode switch 14 to the AUTO position. Display 11 will show number 1, indicating step or program number 1. The TIME key is depressed three times in sequence to enter the day of the week, morning or afternoon and hours and minutes as previously described. The TEMP button is then pressed and the desired temperature entered. To enter additional programs, the STEP key is pressed and the above procedure repeated. Each time and temperature instruction represents the time at which thermostat 10 is programmed to change the ambient temperature to the respective desired temperature. A total of 15 steps may be entered during a seven day cycle. To repeat a previous day's program, the TIME key is pushed and the new day is entered; then the RPT key is depressed. Upon completion of programming, the END key is pushed. To begin operation, mode switch 15 is moved to the HEAT or COOL position and system operation will commence after a one minute delay period. Digital processor 23 will automatically control heating and/or cooling operations to maintain desired temperatures in accordance with the sequence programmed therein. In order to conserve power in the present LED embodiment, display 11 does not remain on during normal system operation. If readout of the actual time and/or temperature is desired at any time, the TIME and/or TEMP keys are pushed and display 11 will show the actual time and/or temperature. A further feature of the invention enables the user to temporarily interrupt automatic operation without having to program thermostat 10. To accomplish this temporary interruption, mode switch 15 is moved to the SET position and the INTERRUPT key is pushed. The TIME and TEMP keys are pressed to enter the desired duration of interruption in hours and the desired temperature. Mode switch 15 is then returned to the HEAT or COOL position and digital processor 23 will maintain the desired temperature during the period of interruption and then return automatically to the programmed sequence at the conclusion of this period.

DESCRIPTION OF A SECOND EMBODIMENT

Figure 6:
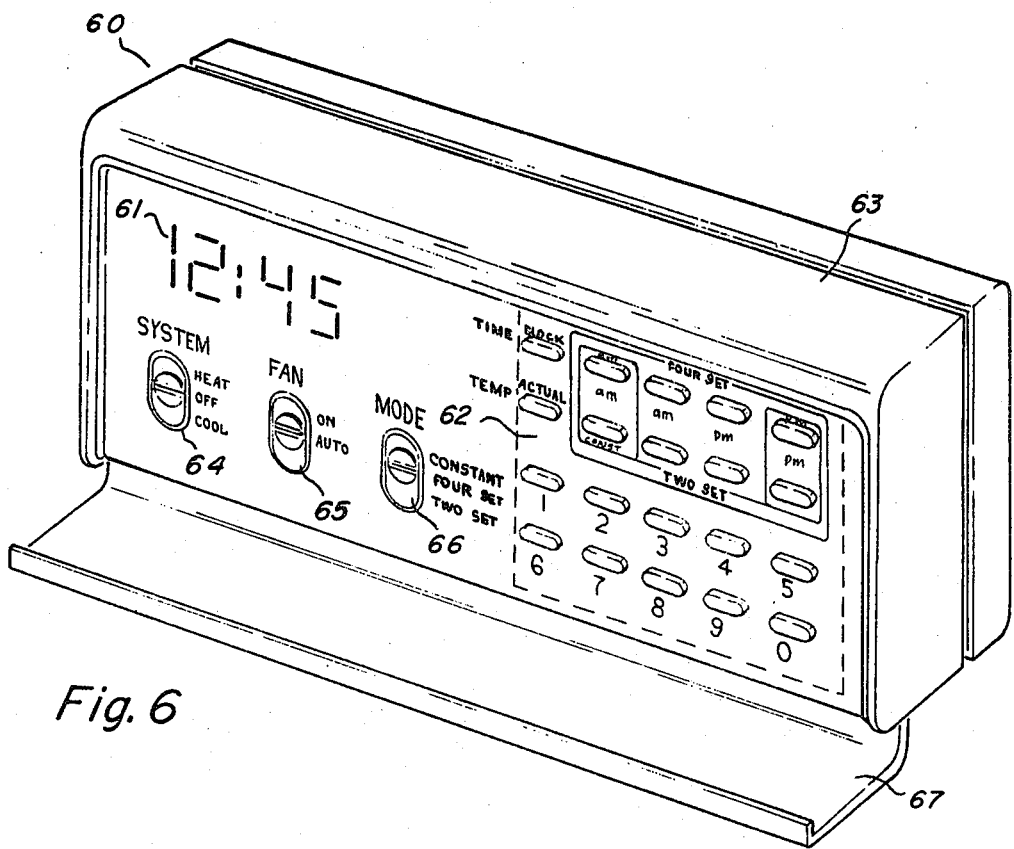
FIG. 6 is a perspective view of a second embodiment of a thermostat system in accordance with the present invention.

FIG. 6 shows a perspective of a second embodiment of a thermostat 60 having a box-shaped housing 63. Display 61 comprises a four digit LED display. Keyboard 62, delineated by dotted lines, contains 10 number keys for entering digital information and a plurality of TIME and TEMP keys.

The far left TIME and TEMP keys are used to set in and display clock time and actual temperature. The four TIME and TEMP keys to the right are used to program thermostat 60 for automatic operation.

Mode switches 64, 65 and 66 are manually settable for thermostat 60 to operate in a cool or heat mode, a fan on or fan automatic mode, and an automatic or constant mode, respectively. During normal operation, a door 67 is hingedly attached to the bottom of thermostat 60 to cover mode switches 64, 65 and 66 and the 10 number keys of keyboard 62.

Figure 7:
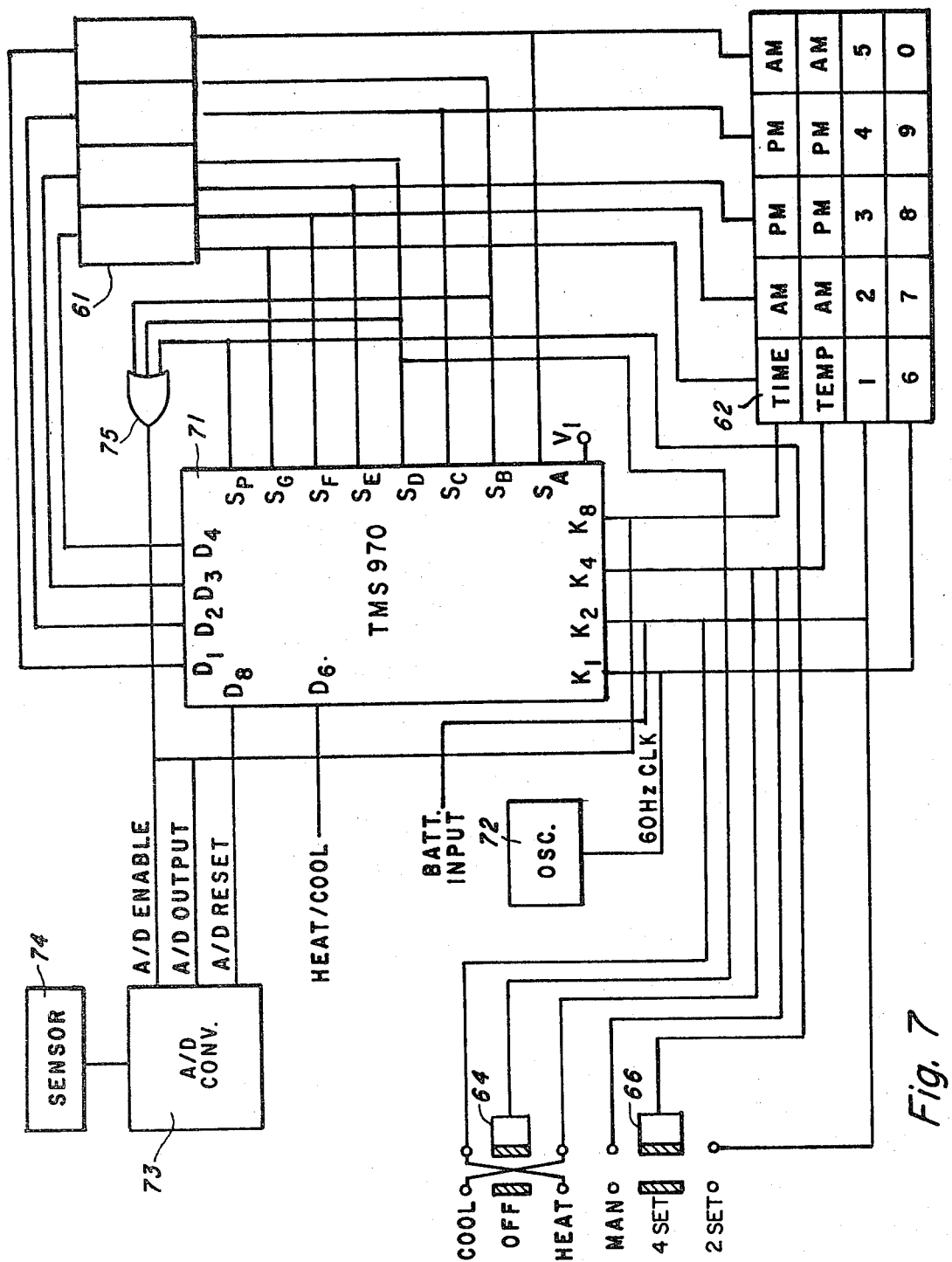
FIG. 7 is a circuit diagram of the thermostat control system embodied in the thermostat of FIG. 6.

FIG. 7 shows a circuit diagram of the control system contained within housing 63. The heart of the system is digital processor 71, comprised of a microprocessor with ROM and RAM preferably contained on a single semiconductor chip such as the digital processor TMS970 microcomputer generally used for calculator type operations, which is manufactured and sold as a standard product by Texas Instruments Incorporated. Digital processor 71 has a ROM in which is permanently stored an instruction sequence for controlling the operation of thermostat 60, a RAM for storing coded information while the information is being processed and an arithmetic/logic unit for performing logic operations in an arrangement substantially similar to that shown in FIG. 4b. The ROM instruction codes are listed in Table II. The ROM is programmed for a known delay period such that digital processor 71 will not change the state (i.e. activate or deactivate) the heating and/or cooling systems until they have remained in their present states of deactivation or activation for at least the delay time period, which is typically 3 minutes in duration. This delay time function prevents wasteful cycling of the heating and cooling systems and prolongs system life.

Figure 8:
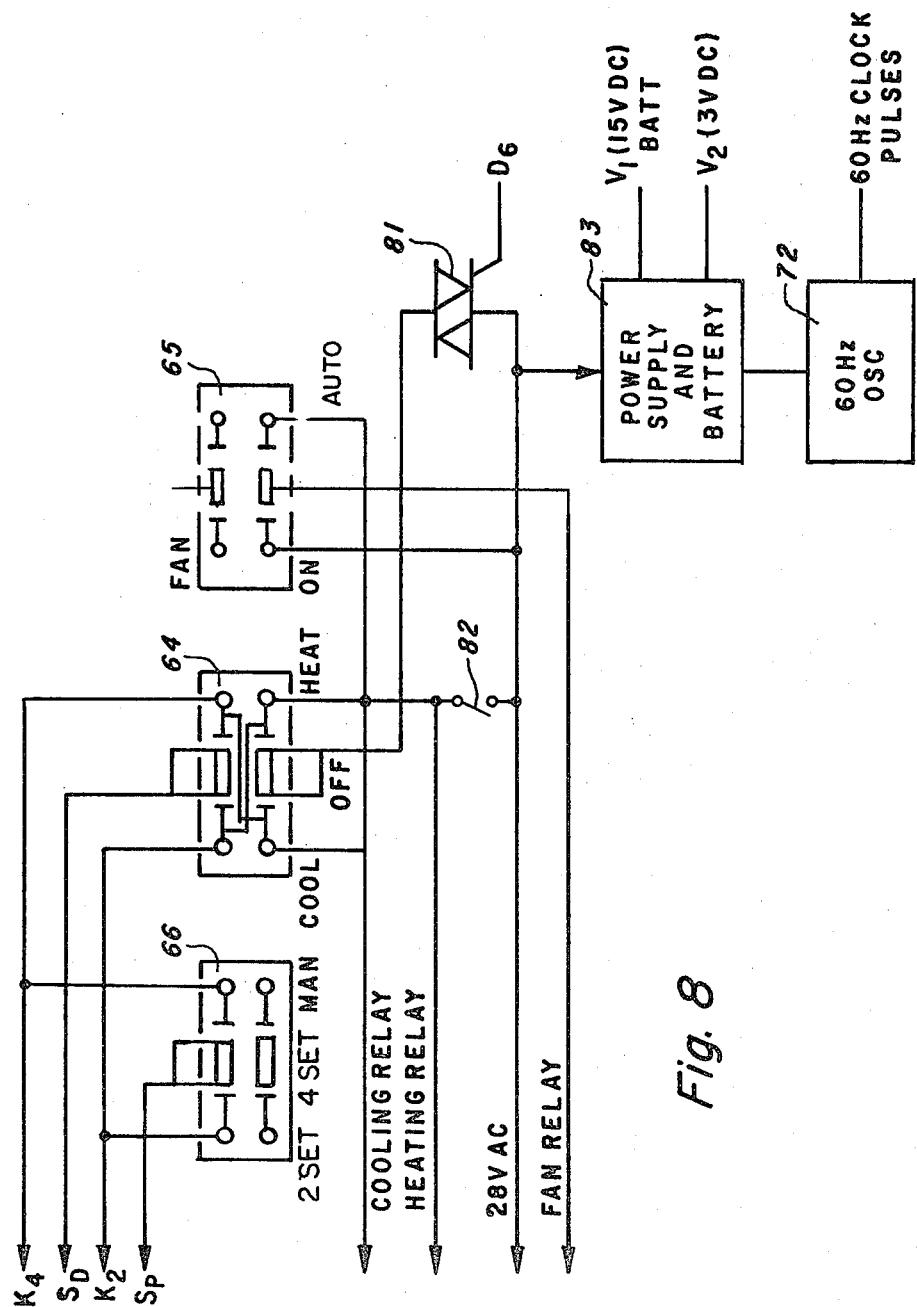
FIG. 8 is a circuit diagram of the heating, cooling and fan relay systems and the thermostat mode switches for the thermostat of FIG. 6.

Coded time and temperature information are entered into digital processor 71 and stored in the RAM via the keyswitches of keyboard 62. Desired temperatures and selected times of a time cycle are entered in digital processor 71, thereby programming it for automatic operation. Digital processor 71 automatically controls the operation of the heating and cooling systems to maintain the desired temperatures in accordance with the programmed time sequence. It selectively transmits electrical signals in sequence from output terminals D1–D4, D6, D8 and Sa–Sg and Sp and receives signals via input terminals K1, K2, K4, and K8. A 60 Hz oscillator 72 supplies 60 HZ clock pulses to digital processor 71 enabling digital processor 71 to keep track of real time. Digital processor 71 is supplied with a DC voltage input V1 from a power supply (FIG. 8). A backup battery power supply is available in the event the main power supply system fails. The backup battery power supply enables digital processor 71 to retain its stored programmed instructions and to continue timekeeping operations.

FIG. 7 shows display 61, keyboard 62 and A/D converter 73 being connected to common output terminals of digital processor 71. The number of electrical conductors and connections needed is minimized thus permitting a single semiconductor chip to be used. Output terminals Sa–Sg selectively scan the seven segments on each display digit in sequence and output terminals D1–D4 activate the four digits in accordance with the scanned sequence. Terminals Sa, Sc, Se, Sf and Sg also scan the keyswitches of keyboard 62 and digital processor 71 receives input signals indicative of the positions of the keyswitches via input terminals K1, K2, K4 and K8. Mode switches 64 and 66 are scanned by output terminals Sd and Sp, respectively, with input signals indicative of the positions of these switches received via input terminals K2 and K4.

A/D converter 73 is selectively enabled by the output of OR gate 75, which receives inputs from output terminals Sb, Sd and Sp. Output terminal D8 resets A/D converter 73 after a digital signal output indicative of the ambient temperature has been transmitted to input terminal K8. Temperature sensor 74 comprises a silicon spreading resistor whose electrical resistance varies with the ambient temperature. The use of a silicon spreading resistor enables large resistances to be obtained with a low cost, planar resistor configuration. Digital processor 71 monitors A/D converter 73 in a manner similar to that described with respect to digital processor 23 in the first embodiment. Digital processor 71 receives a digital signal indicative of the ambient temperature and compares it and the real time with the desired temperatures and selected times programmed therein. Digital processor 71 controls the heating and cooling systems to maintain the desired temperatures in accordance with the programmed time sequence.

Digital processor 71 controls a switching means such as triac 81 shown in FIG. 8. When gated by a signal from terminal D6, triac 81 drives AC current to the fan, air conditioning and heating relays in dependence upon the state of mode switches 64, 65 and 66. Mode switches 64, 65 and 66 are, for example, double pole multiple throw slide switches, which are manually settable. Mode switch 64 is set for cooling or heating; switch 65 is set for fan ON or fan AUTO mode. Switch 66 is set for constant operation, in which thermostat 60 maintains a particular temperature continuously, and for two modes of automatic operation, the two cycle (four set) and one cycle (two set). Digital processor 71 scans the positions of switches 64 and 66 from output terminals Sd and Sp and receives input signals at terminals K2 and K4.

To enable the standard 4-wire thermostat connection to be utilized, the cooling and heating relay wires are connected via terminals in mode switch 64 so that a small trickle current, which is insufficient to activate either system, flows through the heating relay when mode switch 64 is in the COOL position and through the cooling relay when switch 64 is in the HEAT position. As a safety backup feature in case of system failure, a conventional bimetallic temperature sensor 82 is connected to the heating relay to insure that the heating system is activated when the temperature drops to a threshold level, typically 40° F. Power supply means 83 receives AC voltage from the 28 volt AC supply and reduces and rectifies it to provide a DC voltage input V1 of approximately 15 volts for digital processor 71 and a DC voltage V2 of approximately 3 volts to drive LED display 61. Power supply means 83 also powers oscillator 72, which is synchronized with the 60 Hz AC line input.

MODE OF OPERATION OF A SECOND EMBODIMENT

Referring again to FIG. 6, thermostat 60 may be programmed for various modes of operation by manually setting switches 64, 65 and 66 and entering coded temperature and time information into digital processor 71 using the keyswitches of keyboard 62.

To program thermostat 60, the time of day clock should first be set. The TIME key labeled clock is pressed and the correct time is entered using the numerical keyswitches. Then AM or PM is entered using the far left AM key and the far right PM key. To set in a temperature for the constant mode of operation, mode switch 66 is moved to the CONSTANT position. The TEMP key labeled CONST is pressed and the desired temperature is entered using the numerical keys.

To program thermostat 60 for one cycle automatic operation, mode switch 66 is placed in the two set position. The far left AM TIME key and the far left TEMP key are pressed; the time at which a temperature change is desired and the ambient temperature desired at that time are entered using the numerical keys. The above procedure is repeated after pressing the far right PM TIME key and far right TEMP key. Thus the one cycle mode of automatic operation allows for a maximum of two temperature changes during a daily time period. For example, one may program thermostat 60 for night setback operation such that the ambient temperature is lowered at bedtime and remains at a low level until wake up time, at which time thermostat 60 may be programmed to return the temperature to a more comfortable level.

Figure 9:
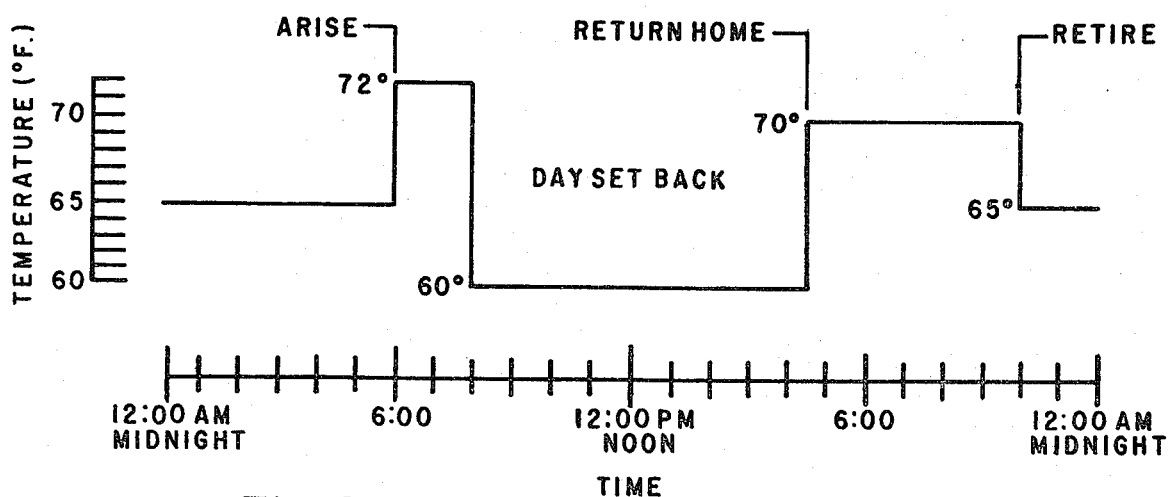
FIG. 9 is an illustration of an automatic temperature control sequence for a heating cycle.

Similarly, thermostat 60 is programmable for two cycle operation. Mode switch 66 is placed in the four set position. Beginning with the far left AM TIME key and TEMP key and proceeding through the far right PM TIME key and TEMP key, each of the four TIME and TEMP keys is pressed in sequence and four selected times and temperatures are entered using the numerical keys in the same manner as previously described. Thus a total of 4 times and temperatures may be programmed for two cycle operation. An example of two cycle operation for a heating cycle is shown in FIG. 9. Thermostat 60 is programmed for daytime setback to 60° F. from 8:00A.M.–4:30P.M., the temperature is set for 70° F. and a night setback temperature of 65° F. is programmed for 10:00P.M.–6:00A.M. At 6:00A.M., the temperature is set for 72° F.

Once programming is completed, mode switches 64, 65 and 66 are set for the desired operation. While thermostat 60 is in operation, actual and programmed times and temperatures are displayed by pressing the appropriate TIME and TEMP keys. Individual programmed instructions may be changed at any time without changing the entire program. The proper TIME key is pressed and the selected time entered using the numerical keyswitches. Similarly, temperature instructions are entered by pressing the proper TEMP key and entering the desired temperature using the numerical keyswitches. In addition, automatic operation of thermostat 60 is temporarily interrupted by setting mode switch 66 to CONSTANT and setting in a desired temperature. Thermostat 60 will continuously maintain this desired temperature until mode switch 66 is shifted from the CONSTANT position. Automatic operation is restored by changing mode switch 66 back to the four set or two set position.

Various embodiments of the invention have now been described in detail. These embodiments provide automatic temperature control and energy savings and are inexpensive to produce. Since it is obvious that many additional changes and modifications can be made in the above-described details without departing from the nature and spirit of the invention, it is understood that the invention is not to be limited to said details except as set forth in the appended claims.

TABLE I

```
ROM CODE ASSEMBLY 000 3E 0 MP1022    0060 0044 0085 0028 0049 0006 00A9 004C 0060 0027 0003 00A6 0021 0044 0033 00BC 0030
011 E1 0 MP1022    00B5 0061 0070 007A 0040 00D1 007A 0044 007A 0062 002C 00B6 0048 0079 0079 0038
022 8F 0 MP1022    0060 0085 0003 0044 00B8 003E 0062 036C 0018 0019 C03C 0021 002C 0085 00A5 003A 0091
033 98 0 MP1022    0025 0066 0061 0021 0064 000F 0045 0027 0044 0040 0027 0028 0027 0000 0025 0000 002A
044 70 0 MP1022    0049 000F 003A 0012 0092 003B 003B 0018 0021 00A6 0044 0384 0014 00A4 002E 0030 00C0
055 CE 0 MP1022    0010 002C 0015 0021 000C 004C 0033 002C 0021 0048 00C0 0048 0042 0030 004A 001E 0014
066 FE 0 MP1022    002C 0095 003S 0027 00FD 0000 0013 004C 00C0 0045 00C0 00FC 0028 0038 00A6 004C 0021
077 CA 0 MP1022    0040 0010 0045 001B 0028 0040 0027 002A 0027 0000 002A 0000 001D 00C0 0048 004C 0094
088 20 0 MP1022    002C 0044 004F 0030 002E 0013 0017 0070 0064 0010 0043 0021 0097 00D2 001C 00D9
099 FA 0 MP1022    0015 0032 003S 004A 00E5 009E 004A 0032 002A 00A2 003S 0040 008C 0033 0050 003B 0017
0AA 75 0 MP1022    000F 0068 0085 0017 003A 000B 0037 004A 0018 001C 00E0 00C2 0014 00FC 002E 0043 002E
0BB C0 0 MP1022    0017 0033 003S 002A 00B0 0000 0019 0009 0025 0060 004A 0016 0027 002C 0007 000F 003A
0CC 09 0 MP1022    0060 003S 003S 0014 0000 0018 004F 001E 0060 0027 0040 0034 0092 003A 0092 009B 0060
0DD D5 0 MP1022    0013 0060 0014 003C 00A6 0000 0032 00C0 0068 002C 004E 003B 00C0 0000 000F 0048 003A
0EE F7 0 MP1022    00F9 0019 003A 00E5 0030 002C 004C 0030 0018 001D 001F 00E5 000B 00EC 0010 0060 0017
0FF 36 0 MP1022    00F5 0000 00FC 0000 0017 C0E5 001B 009A 0084 00C8 0012 0042 00C0 0017 002E 002E 009E
110 EF 0 MP1022    0000 001A 001E 0014 001D 0038 0078 C014 001E 0035 003A 0042 00FC 0042 0080 00AF 0017
121 EA 0 MP1022    00A3 0000 003S 0038 003A 03AE 004C 0083 00AB 0092 00A1 03C9 0027 003A 007B 003B 00B3
132 EB 0 MP1022    00C0 009E 0007 00AB 0C48 00B5 003A 00C0 0040 003E 001B 0010 00CB 0000 0000 0025 0000
143 83 0 MP1022    0017 00E5 0048 0068 0059 00C0 0060 0016 0086 0017 0060 002E 0044 0016 00C0 00AF 003D
154 16 0 MP1022    0074 0036 0076 003F 0C74 0017 0007 0C0F 00D2 0044 0030 003F 0068 00J4 0030 0338 002E
165 96 0 MP1022    001D 0083 0068 001B 0050 0036 0027 0025 0085 003A 09C0 00C6 0033 0027 003A 001E 03D2
176 A0 0 MP1022    0045 007A 003A 00C0 0088 003E 001B 0040 001D 00C0 0000 0014 0000 0065 001A 0092 003A
187 7D 0 MP1022    0025 0091 00C0 003E 0017 003F 0032 007A 00D4 007A 0000 003E 0079 00E5 0000 0082 C000
198 5B 0 MP1022    001A 001E 0027 0040 0086 003S 003S 00D9 009A 0048 0060 00A6 00A6 007A 0048 0080 002E
1A9 77 0 MP1022    003A 0000 00C0 0017 064C 0014 009A 00C0 009E 0033 001E 003A 003E 0042 0016 003A 0086
1BA DA 0 MP1022    001B 0084 0044 009E 0068 0064 0011 0025 0080 002A 0046 0007 0012 0014 001E 031B 0092
1CB 5D 0 MP1022    0033 006B 003A 0016 0010 0033 009E 003B 0010 007A 00C0 00AE 00C0 0007 0038 00FC 0080
1DC 8D 0 MP1022    0065 003S 0048 0030 0079 0084 00B2 008E 00C0 004C 002A 00D1 003A C0A3 0048 001D 0027
```

TABLE I (CONTINUED)

```
1ED 06 0 MP1022    002E 002E 0042 0038 0067 008B 0019 0014 009E 00C0 0038 0060 0018 0048 0040 000F 006F
1FE 95 0 MP1022    03D9 0017 C000 001D 0000 0C40 003A 00C0 0007 0014 003A 0032 0038 0089 0C8F 00B9 001E
20F CC 0 MP1022    0097 0000 0048 0050 0097 0040 0014 00FC C000 00D1 007C 004C 0025 0085 00C0 003E 009C
220 36 0 MP1022    00C0 0049 0000 0042 003A 0012 0027 0038 00B9 0010 0000 0092 0038 C019 0025 00D9 0028
231 83 0 MP1022    007C 001B 001E 0007 0011 00B9 00C0 00B9 005E 00B4 0010 0023 007D 003E 0049 0060 0040
242 1C 0 MP1022    000F 002C 004F 0067 001D 0028 00A4 0025 0040 0052 003E 00C0 0020 002C 0060 004C 0019
253 4F 0 MP1022    008B 00A1 002C 0020 0028 0050 00A6 0044 0042 0098 0064 0020 0060 0028 00C0 0060 009C
264 B4 0 MP1022    008B 0038 002D 0028 00A6 0029 0025 0021 0060 0366 0028 003A 001B 0CAF 00AB 0021 0018
275 04 0 MP1022    0033 00BF 00A7 0053 0059 0060 0050 0020 0067 006F 032F 0085 0042 0CC0 002E 0045 0035
286 3F 0 MP1022    0045 003A 0085 0033 0081 00AE C021 00CD 0021 003A 007B 0042 00B1 0085 0045 0094 0049
297 82 0 MP1022    0081 002A 0031 0099 000F 002A 002A 003A 003F 8039 003D 00B1 0042 0042 003A 0045 004A
2A8 32 0 MP1022    0083 0028 0085 0077 003C 0021 00CA 0085 0035 0028 003C 0035 0070 0001 002E 00AD 003F
2B9 33 0 MP1022    00B5 004A 0000 0000 00BC 002E 00AD 0300 0060 0000 002E 004A 0051 0086 004C 0027 0025
2CA DE 0 MP1022    005F 0000 003A 0079 006A 0068 0005 008D 0095 0097 0068 003B 000B 002E 0025 007A
2DB C4 0 MP1022    0027 009F 0807 0007 0040 002C 007A 0000 0027 0044 007A 008D 00A3 0079 0007 0085 008D
2EC 68 0 MP1022    0027 004A 002C 000F 003E 0007 0035 00C2 002A 003E 0097 0069 0069 00BB 002E 008B 008D
2FD 60 0 MP1022    0088 0039 0036 0000 0049 0000 007F 0040 0005 0027 000B 002A 0041 0053 0027 0002 0039
3CE 33 0 MP1022    000D 006A 0058 000B 0007 002A 0039 0039 0034 002A 000C 0027 00CB 0095 002A 0049 0008
31F 05 0 MP1022    006E 000D 003E 0041 0080 004E 002A 006B 0039 0041 00A6 0099 004E 032C 003E
330 AC 0 MP1022    0049 0092 0041 0080 002A 0041 003A 0027 0039 0027 000D 0008 0049 0027 0077 000D 0CC0
341 2D 0 MP1022    002E 0000 008B 009D 0038 004E 000F 00A2 00BD 0027 00AE 0002 00C4 003E 0030 0007 0025
352 66 0 MP1022    0046 0008 0037 009E 000A 002A 0046 00CA3 0021 0092 007A 00B1 004A 0034 00B3
363 D3 0 MP1022    0060 00AC 0307 005C 0007 00A2 0056 0025 0007 0093 0021 0028 000C 00B1 007C 00CD 0003
374 CA 0 MP1022    0046 0007 0026 0035 00AF 002A 009E 000C 00A4 0077 000B 000D 003F 0086 0000 002A 004F
385 50 0 MP1022    0005 0064 0028 0044 004A 0025 0056 0021 003D 0083 0028 0052 0068 002E 002E 009D 0028
3T6 52 0 MP1022    0078 0020 0078 0034 0027 0063 002C 0073 007B 0061 0078 003D 00AA 0021 0021 000F 0042
3A7 32 0 MP1022    0040 000F 0097 006B 007F 000F 009C 0060 0077 0062 002E 0081 000F 0046 0064 0060 0078
3B8 EE 0 MP1022    000F 0060 003D 0042 0042 00A7 0028 0027 0080 0097 0000 007F 004F 0038 002E 0068 002E
3C9 62 0 MP1022    000B 008B 00AD 00C0 0069 00DD 002F 0059 0064 0049 004F 0018 0083 000F 004F 00C0 0080
3DA BB 0 MP1022    0038 0065 00DD 0070 0028 0028 003A 006C 000B 0064 0022 0068 0048 002C 0049 009D 0030
3EB F1 0 MP1022    002A 009B 001B 007E 0010 0065 0021 0042 003A 006C 0028 00DD 0024 002B 0029 0049 002F
3FC 6C 0 MP1022    002E 00DD 007A 00DD 0000 0328 0000 002E 004A 004B 0056 0052 0021 0007 00A9 0035 003A
40D FF 0 MP1022    0028 0042 0050 0080 0044 002C 0028 009C 0080 002E 0025 0021 0028 002C 004B 008E 0021
41E A6 0 MP1022    000B 004B 008B 0073 008D 0025 0047 002E 0080 0018 0033 0027 0007 0079 0028 0040 00B3
42F 90 0 MP1022    0084 002E 0C14 0075 C044 0037 004B 00B7 004F 0CC0 0039 0031 0028 000B 0015 0030 0014
440 60 0 MP1022    0098 004D 0000 0027 0028 0021 001F 0021 008B 002E 0023 002E 0047 00C0 00DD 0098 00BC
451 2C 0 MP1022    001B 002E 0001 0017 0042 0050 0028 0013 00B4 0014 0047 003E C008 0073 00B6 002A 00A1
462 A3 0 MP1022    0018 004F 00A6 00DD 001B 0081 00AD 0060 0001 0021 0025 00BA 0047 0000 0013 0060 00A4
473 5F 0 MP1022    0000 0023 001B 0028 0043 00B9 008C 002A 002C 0027 0000 0010 002C 001C 0098 0030 004F
484 E7 0 MP1022    002A 002A 0018 0014 0091 0010 0000 004B 0021 0000 0056 00AD 00C0 0028 0018 0080 0021
495 C9 0 MP1022    00E8 0081 00E5 0039 002E 0017 0098 0028 002A 0095 0014 0000 00AD 008B 0098 0013 0001
4A6 EE 0 MP1022    0030 00D3 0021 0028 0017 0017 0023 00AC C000 008B 00B1 0000 0018 00C0 0015 004B 0018
4B7 24 0 MP1022    0021 00A7 00AD 0001 0047 0001 0014 001B C06D 00C0 0011 0000 001B 00EC 0038 009E 0089
4C8 FA 0 MP1022    0022 00C0 0027 00A1 000B 0040 0018 001F 0000 002C 002F 0093 0016 001E 004C 000B 0095
4D9 C6 0 MP1022    003A 00C0 0038 0048 003A 0044 0038 0044 003A 00C0 003E 0064 004F 0042 0017 00BF 00A6
4EA 33 0 MP1022    003F 00C0 004B 0033 00C0 001C 0012 0092 000B 000B 0089 00B4 001D 0038 003A 00EC 0093
4FB 60 0 MP1022    00A6 003A 0014 001B 0008 0037 0044 00B0 002C 004F 0014 00A6 003A 0038 004F 0097 003A
50C 6E 0 MP1022    0022 004C 001B 009B 001A 0099 009D 0016 0092 0022 009E 000F 00DD 0040 0012 0038 002F
51D A5 0 MP1022    00C0 001C 0018 00C0 0038 00C0 0048 0038 001A 00D1 002C 003A 003A 003E 0028 0042 001B
52E 48 0 MP1022    0027 000B 00A6 0019 001D 00AB 0095 0012 0078 0048 000B 00BB 003A 008B 0007 0093 00BD
53F EC 0 MP1022    007B 0030 0077 00C0 007D 0327 0085 0017 0014 001D 00A6 003A 0096 008F 00C0 000B 0018
550 A8 0 MP1022    0040 001B 00C0 0092 0060 004C 0007 0095 00C0 0048 003A 001B 0060 0012 00E8 000B 003F
561 CE 0 MP1022    000B 0316 0044 0042 00DD 00C0 0038 0097 00D9 000B 0038 008F 00B0 0010 000B 00E5 001E
572 08 0 MP1022    0027 00A6 00DD 003A 008B 0012 00D1 00C0 0017 00AB 001F 0019 0017 00C0 0000 001E 0000
583 C4 0 MP1022    003A 00BC 00C0 0021 002C 002A 00FC 0048 008B 0038 007D 0022 0037 0080 0040 0043 0027
594 57 0 MP1022    001A 0019 001F 000B 0017 004D 000F 0027 C097 002D 00B3 002C 000B 002D 0000 0021 0035
5A5 C9 0 MP1022    0027 004F 0010 002C 0027 001E 00D1 00B4 00C0 0038 002A 0022 002C 000B 00B5 0021
5B6 43 0 MP1022    0016 007C 00B4 00A6 004F 0021 0014 CC1A 003A 0048 0000 001E 0000 001B 00DD 003A 00A6
5C7 2E 0 MP1022    00A6 0027 0034 0038 003E 008D 000B 001E 0018 0080 0000 0092 C02D 0027 0011 0036 004C 0000
5D8 87 0 MP1022    0095 0022 003A 00BF 0048 003A C044 00BD 0040 003A 0000 0038 0011 0084 0042 00A2 003E
5E9 40 0 MP1022    00A6 00C0 0069 0033 0038 00C0 004F 0014 0092 000B 00B2 002C 0029 001D 0038 003A 00DD
5FA 62 0 MP1022    0048 00A6 0038 0014 001B 0080 0014 0080 0092 001F 00C0 002C 0077 0004 0020 00E1 001D
60B 2E 0 MP1022    004F 0C0B 0027 002D 0011 0064 0029 002F 0000 0022 002D 0030 002C 0080 0086 0091 0004
61C 48 0 MP1022    001E 0038 0022 002F 0027 007F 000B 0021 00A6 0027 0027 0023 00E1 00AC 0043 0027 000F
62D DC 0 MP1022    0032 004F 00AD 002D 0098 0007 00C5 0000 0023 002C 003A 0007 009D 0034 00AC 00C0 0029
63E 74 0 MP1022    0016 008B G08F 0060 0000 004A 002C 0060 003A 0038 003A 00FC 00BC 000F 0021 00A6 0028
64F DD 0 MP1022    0032 0079 0040 0099 0048 001B 003E 0021 007A 004C 0038 0019 0038 0040 0044 0048 001D
660 C3 0 MP1022    0060 0042 0027 0015 0038 0019 0021 0015 000B 0041 0080 0015 00DD 0028 0028 004C 0013
671 67 0 MP1022    004E 0025 0085 00A6 0095 0021 002C 002C 0046 00C0 0027 0028 0027 002C 0027 008B 0027
682 8E 0 MP1022    0000 0025 0019 003F 0045 00DD 00D1 00A6 001D 002E 0059 0021 0060 0018 0040 00FC 000B
693 05 0 MP1022    00C0 0049 004C 0079 C095 0059 000F C03A 002C 00A5 0060 000B 002C 00CF 002E 001D 001B
6A4 6B 0 MP1022    0042 C019 004A 0038 0010 00B0 00CB 0038 0021 0025 00C0 0027 0027 002C 009D 00A6 0048
6B5 70 0 MP1022    000B 001E 0007 0060 000B 0040 000F 002E 0019 0031 004A 0000 000B 0000 003A 00AF 0015
6C6 23 0 MP1022    00A4 0068 0064 008C 0060 0082 0013 0077 00AD 0080 000B 000B 00A4 0044 0004 007C
6D7 36 0 MP1022    008C 000B 0042 0077 0091 0038 0025 0088 0078 00C0 0027 0000 008D 000B 0086 00A7 0000
6E8 3A 0 MP1022    0092 00AB 0000 001D 003E 0027 0015 0027 0078 003E 001E 0011 0074 003E 0080 007D 0049
6F9 1E 0 MP1022    003A 00A3 003E 008B 002E 0019 004C 0000 0060 0000 0045 0060 004E 0049 0047 009A 0000
70A 34 0 MP1022    0023 000C 0041 0007 0005 0098 0000 0096 001F 0018 0085 0000 0096 0000 0036 00A9 0010
71B 03 0 MP1022    00A9 007F 005D 00B3 0082 0045 002E 0000 00C0 0000 0027 0070 0000 001D 003A 0000 0000
72C 2B 0 MP1022    0055 00A1 007F 0007 000F 007F 0083 00D7 0025 006C 0027 0041 0027 009E 000B 008F 0006
73D 5A 0 MP1022    0006 0036 00AF 0000 007F 0000 004A 0032 0077 0027 0045 0027 0000 0027 008B 0046 002A
74E 69 0 MP1022    0027 0010 0000 0021 0043 0035 0033 0000 003F 0000 006B 0091 00B7 0043 006F 0040 000B
75F A3 0 MP1022    004D 0028 0049 0000 0021 0037 0049 00B7 0000 004D 004C 0000 0000 002A 00AC 0044 002E
770 ED 0 MP1022    002E 0048 0040 0000 0021 002E 0027 0028 0027 008D 0021 00B7 0060 00A3 008D 0067 0047
781 92 0 MP1022    006A 0092 002A 004B 0062 0025 004F 001B 0022 0027 002A 0039 0060 006A 004F 002C 0093
792 BC 0 MP1022    003E 0018 0047 0029 0060 0034 00C2 002C 003E 000F 00AF 0068 0082 008D 0040 004C 0060
7A3 54 0 MP1022    00AD 00B1 004F 0040 0047 0038 0040 0043 0001 0007 006C 0060 009C 002C 0028 0028 0027
7B4 13 0 MP1022    0021 0043 0068 0028 00AC 0040 0073 0082 003D 0028 009D 000B 002C 0084 002C 004F
7C5 62 0 MP1022    004F 004F 002C 000E 002C 0043 0022 0038 0022 004F 004F 0043 0036 0047 003A 0029 004F
7D6 E5 0 MP1022    0091 0047 002A 0043 0022 002D 00A4 0022 0027 002A 0027 002C 0030 009F 00AB 0036 0890
7E7 BB 0 MP1022    0021 0022 0070 0027 0043 0021 0077 004F 002A 0027 0038 0047 002D 0021 0025 002A 0021
7F8 59 0 MP1022    0043 0021 004D 0023 004F 002C 002F 0022 0000 0000 0000 0000 0000 0000 0000 0000
809 EF 0 MP1022    0000 0000 0000 0000 0000 0000 0000 0000 0000 0000 0000 0000 0000 0000 0000 0000
81A CE 0 MP1022    0000 0000 0000 0000 0000 0000 0000 0000 0000 0000 0000 0000 0000 0000 0000 0000
82B CD 0 MP1022    0000 0000 0000 0000 0000 0000 0000 0000 0000 0000 0000 0000 0000 0000 0000 0000
83C BC 0 MP1022    0000 0000 0000 0000 0000 0000 0000 0C00 0000 0000 0000 0000 0000 0000 0000 0000
84D AB 0 MP1022    0000 0000 0000 0000 0000 0C00 0000 0000 00C0 0000 0000 0000 0000 0000 0000 0000
85E 9A 0 MP1022    0000 0000 0000 0000 0000 0000 0000 0000 0000 0000 0000 0000 0000 0000 0000 0000
86F 89 0 MP1022    0000 0000 0000 0000 0000 0000 0000 0000 0000 0000 0000 0000 0000 0000 0000 0000

END OF ROM CODE ASSEMBLY
```

TABLE II

```
ROM CODE ASSEMBLY

000 B9 0 MP6061    0023 004C 00B0 003D 0046 000D 0046 00A5 004D 00A4 004F 002C 002A 0022 003D 003A 0080
011 CB 0 MP6061    0054 00B6 0003 00A1 0045 0094 0080 00DF 0003 0099 0050 009F 0010 003E 0021 0007 003D
022 DE 0 MP6061    0047 005A 001F 0088 0080 00AA 0081 0019 0014 0038 0046 001A 00A8 0047 0008 0026 002F
033 F0 0 MP6061    0039 00B4 001C 0038 00AB 0018 0045 000F 003B 0001 0049 000A 0003 003B 002B 000A 003D
044 5B 0 MP6061    004D 0021 0006 00EB 000E 00CF 002F 0048 0038 00A9 002C 000D 002E 009C 00B6 0007 000D
055 97 0 MP6061    002E 000F 002E 0040 004C 002F 0021 0088 009D 009D 00CF 0022 0021 001D 00CF 0049 00C9
066 89 0 MP6061    009D 009B 0010 0022 002B 002B 000F 0021 003C 0007 00FD 003E 000D 000F 00C9 000D 00AF
077 87 0 MP6061    0040 00B3 002C 0011 003D 003F 002C 0022 004D 001A 00AF 0089 0049 0039 0007 0032 004E
088 48 0 MP6061    0080 0021 0003 0088 00A7 0008 006F 006A 0070 0015 00B7 003E 003E 0078 0084 00A7 0021
099 86 0 MP6061    00EC 00A7 0041 0009 0010 00A7 00A7 0027 0045 0095 0021 0046 0078 004E 00ED 0041 003A
0AA 38 0 MP6061    001A 00AA 0026 004E 0026 0010 003D 0036 0046 0011 0003 000A 003E 0045 0045 00A7 006A
0BB 1C 0 MP6061    0080 009D 003D 0007 00EB 0010 0080 009C 003D 0038 003E 001A 0045 0045 00EC 0028 0046
0CC FD 0 MP6061    00B5 002A 0080 0003 001F 0088 0034 000A 00C7 0043 00B7 00EB 000F 00AB 0043
0DD 3D 0 MP6061    0036 003D 004E 001E 006A 00EB 003E 0095 003D 0010 0010 0026 00BE 0031 0060 00D3 003A
0EE 1A 0 MP6061    00A7 002A 0093 0099 0032 00B7 0069 001C 003A 0034 003A 000F 002A 00B7 007E 0047 0030
0FF A9 0 MP6061    009D 0099 002A 0000 0049 0012 00EB 0028 00AA 00AB 0080 0068 001A 0026 0079 0047 004D
110 91 0 MP6061    001A 0028 001E 001A 003D 0040 001A 0007 007A 007A 0038 00AB 009D 0060 00D7 003B 0060
121 1F 0 MP6061    004D 00FC 0073 00AC 007D 003F 0016 0060 003E 0007 002A 0045 0028 001F 0028 003C 00C6
132 42 0 MP6061    00AB 00A5 0060 00AB 004E 004D 001F 0060 00AC 006A 003D 004E 0041 0031 0018 0039 00B2
143 F9 0 MP6061    004D 0023 009B 0039 003A 009C 0080 00AE 003A 00BC 00EB 0003 0021 0021 0086 0049 0036
154 A3 0 MP6061    00A4 0005 003D 003D 000F 0032 0074 001C 0046 003E 0087 0034 004B 001F 000F 0030 002C
165 07 0 MP6061    0034 003C 0010 00A9 0003 0041 0003 0049 0003 003A 0043 0043 003D 00A5 00B7 0038
176 8F 0 MP6061    0080 003F 000E 0039 0036 0003 0081 002F 004F 003D 0030 0021 003D 0040 003B 0005 0021
187 B8 0 MP6061    003D 003E 0060 004D 0093 00AF 0072 0026 0040 0064 0038 0049 001D 002B 0060 00B3 003E
198 59 0 MP6061    0040 0037 0022 0093 0039 0096 00DE 0070 002B 002B 003D 0060 00A3 0091 002F 0060 000F
1A9 5C 0 MP6061    0074 0049 0060 0021 008D 003F 0045 002B 0022 0022 0060 003D 0035 00DE 000E 0040 003E
1BA 0E 0 MP6061    0093 002B 00BB 003C 00DE 003D 001A 0085 00AC 0049 0039 0005 0037 006C 003F 00A2 0011
1CB D2 0 MP6061    00BD 003F 0047 0047 003A 0011 003B 00D4 0080 0047 00D2 00A2 0060 0039 00A5 0037
1DC D6 0 MP6061    00BB 003F 00A1 003D 0006 004B 00C8 000F 004F 0089 0068 0068 0043 0096 0003 0060 0069
1ED 66 0 MP6061    00BD 001C 004F 0035 00BD 0028 00D2 00A5 0003 0006 002A 00A2 0097 0049 0028 0043 0041
1FE 2D 0 MP6061    00AF 0038 0017 003D 0080 003C 004B 0047 009B 0043 0030 002B 002E 0038 0021 004B 0040
20F A9 0 MP6061    000F 004B 001E 009C 0001 00A3 002B 002A 003F 0038 0033 0018 001F 007D 003A 00AF 0092
220 F7 0 MP6061    0030 001E 0003 003D 002E 00A5 0011 00FD 00C0 004D 000F 0021 003B 0003 002B 00BA 00C8
231 B6 0 MP6061    0080 00B0 00CF 003B 001A 002A 003B 003F 0026 00CF 0033 0080 00BF 0019 0018 002F 0093 00CF
242 1C 0 MP6061    0000 003D 0047 002B 0021 0043 0022 008A 0023 0027 0011 0018 002E 002B 0033 00D1 0011
253 A0 0 MP6061    0040 0097 002E 0091 0011 0043 00B4 002B 00CF 0038 0027 00FD 0007 0018 004D 0012 0099
264 2C 0 MP6061    0022 0040 002F 0070 0091 0007 00B3 002F 00B4 003C 0011 00AD 00CB 00B3 0021 002E 0027
275 80 0 MP6061    0007 00CF 00B4 007D 0018 0091 00BA 00A6 002E 0088 003B 00B3 0080 0080 0021 0013 0021
286 16 0 MP6061    00AF 001B 009E 003F 003A 0013 003B 009F 0038 00BE 001D 001B 00BF 0083 003B 0060 0039
297 CC 0 MP6061    00C0 001B 0080 004D 0021 008B 0021 007C 0039 00BB 003A 003B 0021 0038 003A 007A 0034
2A8 F5 0 MP6061    00A6 00AE 0041 001A 0083 00A8 008F 003B 001B 0086 003A 0032 0013 0039 00B7 003B 0072
2B9 38 0 MP6061    003A 003A 0013 0039 00A1 001B 00AA 0012 000E 0030 0013 00CF 000E 0092 003A 0010 002B
2CA FC 0 MP6061    00A6 001A 002B 0060 0045 00B3 00AB 0038 0030 002E 00FC 00B3 004D 001A 00CB 0092 002E
2DB 73 0 MP6061    0045 00BF 0031 006C 0049 0028 0065 0060 002E 0013 009E 008E 0013 001F 003D 0079 0054
2EC FE 0 MP6061    003D 003A 003F 00AD 003E 00DF 0040 0092 0038 0040 0036 0033 001A 0030 0037 004D 0013
2FD 5E 0 MP6061    00BA 004D 0084 0037 003F 0000 0049 009C 0003 002B 00BE 0035 001D 000F 001D 0045 00BE
30E 8C 0 MP6061    004D 0093 0037 0037 004D 003C 009E 0099 0001 0037 0032 0033 0048 0043 0023 0001 0039
31F 50 0 MP6061    0087 0007 00CF 0042 003B 0016 00AD 0013 00CF 0093 0036 004C 0044 004D 0098 001D 00B4
330 E4 0 MP6061    0023 0088 0034 0023 0006 0012 00AF 0030 003A 004F 0043 0096 0045 0092 0039 008C
341 C0 0 MP6061    0080 0000 002F 009E 004D 0001 005D 00FC 0060 0093 003D 002F 008D 004D 0018 0022 0095
352 F1 0 MP6061    0040 0045 003A 0060 00A1 000F 004D 0018 00CF 00E5 00AF 0021 000E 0001 0010 00CF 0014
363 91 0 MP6061    0022 0033 0001 000F 00AA 0018 0026 0040 0060 00A9 003D 000E 00D5 0018 0003 0037 0001
374 7A 0 MP6061    001A 00CF 000E 0049 0041 000E 00FC 003E 000E 000E 000E 0064 0007 00BC 0018 00CF
385 F4 0 MP6061    0094 001E 0021 009D 0021 00AA 0043 0011 002A 009C 003E 0043 0043 003F 0027 0021 0043
395 F9 0 MP6061    0021 0094 0027 00BB 0007 00BD 00FD 0039 0083 0029 009C 004B 004B 004F 00A6 0039 00A1
3A7 E3 0 MP6061    0047 00AB 004B 009C 0029 0047 004F 0039 0026 003E 001C 0080 0094 0043 001F 0080 003F
3B8 69 0 MP6061    00B4 0020 0094 00A4 0011 003A 0043 00E5 0062 0043 0084 003F 0040 0039 0035 00A6 00A1
3C9 49 0 MP6061    003A 0068 001B 0060 00AA 0064 0093 0039 000F 003E 003D 0031 00A6 0031 0084 0062 0046
3DA 84 0 MP6061    001C 002F 0050 006E 003C 002F 003D 00B6 00A6 0038 0012 00CF 0063 003E 000A 0043 003E
3EB 26 0 MP6061    0064 004A 003E 00C1 000D 002D 004B 0064 0030 0001 0021 003E 0080 003C 00C3 0007 0010
3FC 6F 0 MP6061    0033 00C3 003D 000F 0000 0000 0000 0000 0000 0000 0000 0000 0000 0000 0000 0000
40D EF 0 MP6061    0000 0000 0000 0000 0000 0000 0000 0000 0000 0000 0000 0000 0000 0000 0000 0000
41E DE 0 MP6061    0000 0000 0000 0000 0000 0000 0000 0000 0000 0000 0000 0000 0000 0000 0000 0000
42F CD 0 MP6061    0000 0000 0000 0000 0000 0000 0000 0000 0000 0000 0000 0000 0000 0000 0000 0000

END OF ROM CODE ASSEMBLY
```

TABLE III

HYSTERESIS ALGORITHM/SOURCE CODE FOR ROM

| | | | |
|---|---|---|---|
| CXLD1 | LDX | 2 | |
| | TBIT1 | 2 | HEAT? |
| | BR | TPLS1 | YES |
| | LDP | 7 | |
| | A6AAC | | HYST > 10? |
| | CALL | DMOD1 | YES |
| | LDP | 14 | |
| TPLS2 | LDX | 2 | |
| | TCY | 12 | |
| | TBIT1 | 2 | TRIAC ENABLE? |
| | BR | CMH | |
| CPH | LDX | 3 | |
| | TCY | 15 | |
| | TMA | | ACC = ACT MSD |
| | TCY | 13 | |
| | SAMAN | | ACT MSD < OR = PROG TMP MSD? |
| | BR | TPLSD1 | |
| | BR | MGM | |
| TPLSD1 | DAN | | |
| | BR | BDDC | |
| | TCY | 12 | |
| CTCM | TMA | | ACC = ACT TMP LSD |
| | TCY | 14 | |
| | BR | SCK | |
| TPLS1 | LDP | 7 | |
| | A10AAC | | HYST > 6? |
| | CALL | DMOD1 | YES |
| | LDP | 14 | |
| | LDX | 2 | |
| | TCY | 12 | |
| | TBIT1 | 2 | TRIAC ENBL? |
| | BR | CPH | YES |
| CMH | ALEC | 0 | HYST > 6 (10)? |
| | BR | CMH1 | Y |
| | CALLL | DMOD1 | |
| | CALLL | DMOD1 | |
| CMH1 | LDX | 3 | |
| | TCY | 13 | |
| TEMCOM | TMA | | ACC = CAL TEMP MSD |
| | TCY | 15 | |
| | SAMAN | | CAL TEMP MSD < OR = ACT TEMP MSD? |
| | BR | TPLSD | |
| MGM | LDX | 2 | |
| | TCY | 14 | |
| | TBIT1 | 2 | SELF TEST? |
| | BR | BCNTO | |
| | LDX | 1 | |
| | TCY | 12 | |
| | TMA | | |
| | ALEC | 3 | HYST CNT > 3? |
| | BR | BDDC | NO |
| BCNTO | BL | CNTO | |
| TPLSD | DAN | | CAL TEMP MSD < ACT TEMP MSD? |

TABLE III-continued
HYSTERESIS ALGORITHM/SOURCE CODE FOR ROM

|       | BR     | BODC  |                          |
|-------|--------|-------|--------------------------|
|       | TCY    | 14    |                          |
|       | TMA    |       | ACC = CAL TEMP LSD       |
|       | TCY    | 12    |                          |
| SCK   | ALEM   |       | PROG TMP < OR − ACT TMP LSD? |
|       | BR     | MCM   |                          |
| BDDC  | BL     | DDC1  |                          |
| XTAM  | TAMZA  |       | STORE CNT                |
|       | RETN   |       |                          |
| BLDC  | BL     | DDC1  |                          |
| DMOD1 | TCY    | 8     |                          |
|       | LDX    | 2     |                          |
|       | DMAN   |       | DECREMENT MOD 2 CNTR     |
|       | BR     | XTAM  |                          |
|       | TCMIY  | 1     | LOAD MOD 2 CNTR          |
|       | TCY    | 14    |                          |
|       | LDX    | 3     |                          |
|       | IMAC   |       | INCREMENT ACTUAL TEMP 1'S |
|       | A6AAC  |       |                          |
|       | BR     | CRY1  |                          |
|       | A10AAC |       | RESTORE CNT              |
|       | BR     | XTAM  |                          |
| CRY1  | TCMIY  | 0     | ACT TEMP 1'S = 0         |
|       | IMAC   |       | INCREMENT ACT TEMP 10'S  |
|       | A6AAC  |       |                          |
|       | BR     | CRY10 |                          |
|       | A10AAC |       | RESTORE CNT              |
|       | BR     | XTAM  |                          |
| CRY10 | TCY    | 14    |                          |
|       | TCMIY  | 9     | ACT TEMP 1'S = 9         |
|       | CLA    |       |                          |
|       | RETN   |       |                          |
| CNTO  | LDX    | 1     |                          |
|       | TCMIY  | DLYCT | LOAD X MIN DELAY CNT     |
|       | LDX    | 2     |                          |
|       | TCY    | 12    |                          |
|       | TBIT1  | 2     | TRIAC ENABLE?            |
|       | BR     | PO    |                          |
|       | SBIT   | 2     | TRIAC ENABLE = 1         |
|       | TCY    | 5     |                          |
| ON    | CLA    |       |                          |
|       | DAN    |       | ACC − 15 (BLANK)         |
|       | SETR   |       | LOAD DIGIT BUFFER (Y)    |
|       | BR     | TD01  |                          |
| PO    | RBIT   | 2     | TRIAC ENABLE = 0         |
| P1    | TCY    | 5     |                          |
| OFF   | CLA    |       |                          |
|       | A8AAC  |       | ACC = 8                  |
|       | SETR   |       | LOAD DIGIT BUFFER (Y)    |
| TD01  | TCY    | 6     |                          |
|       | TMA    |       | ACC = SEGMENT CNT        |
|       | TDO    |       | OUTPUT DIGITS            |
|       | RETN   |       |                          |
| DDC1  | LDX    | 1     |                          |
|       | BL     | DDC   |                          |

What is claimed is:

1. A thermostat system for controlling heating and cooling systems supplying an indoor area to maintain desired ambient temperatures during selected time periods in said area, said thermostat system comprising;
   (a) temperature sensing means including at least one temperature sensor for sensing the ambient temperature of said area and for providing a digital signal indicative thereof;
   (b) means for generating time signals;
   (c) digital circuit means having a plurality of input and output terminals, said digital circuit means being coupled to said time signal means and said temperature sensing means for receiving said time signals and for monitoring said ambient temperature, said digital circuit means including logic circuitry for storing digital coded information entered therein while said information is being processed, said digital circuit means being responsive to real time and ambient temperature and to said digital coded information for controlling the heating and cooling systems in accordance with an electronic threshold hysteresis temperature which is variable with time in discrete steps around said desired ambient temperature, said discrete steps successively approaching the ambient temperature;
   (d) data entry means coupled to said digital circuit means for entering said digital coded information into said digital circuit means;
   (e) display means for displaying desired parameters of time and temperature including information entered from said data entry means; and
   (f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

2. A thermostat system for controlling heating and cooling systems supplying an indoor area to maintain desired ambient temperatures during selected time periods in said area, said thermostat system comprising;
   (a) temperature sensing means including at least one temperature sensor for sensing the ambient temperature of said area and for providing a digital signal indicative thereof;
   (b) means for generating time signals;
   (c) digital circuit means having a plurality of input and output terminals, said digital circuit means being coupled to said time signal means and said temperature sensing means for receiving said time signals and for monitoring said ambient temperature, said digital circuit means including logic circuitry for storing digital coded information entered therein while said information is being processed, said digital circuit means being responsive to real time and ambient temperature and to said digital coded information for controlling the heating and cooling systems in accordance with an electronic threshold hysteresis temperature which is variable with time in discrete steps around said desired ambient temperature, said logic circuitry produces a threshold hysteresis temperature characteristic which is a first value for a fixed period of time and changes to at least a second value unless the ambient temperature reaches said first value before such change to said second value which activates or deactivates said heating and cooling system causing said threshold hysteresis temperature to change to a first value of opposite polarity around said desired ambient temperature from said first value and remain at said first value of opposite polarity for a fixed period of time and then change to at least a second value of opposite polarity unless the ambient temperature reaches said first value of opposite polarity before such change to said at least second value of opposite polarity which again activates or deactivates said heating and cooling system;
   (d) entry means coupled to said digital circuit means for entering said digital coded information into said digital circuit means;
   (e) display means for displaying desired parameters of time and temperature including information entered from said data entry means; and (f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

3. A thermostat system according to claim 2 wherein said first temperature value is equal to said first temperature value of opposite polarity.

4. A thermostat system according to claim 3 wherein said equal value is in the range of 0° to 1° F.

5. A thermostat system according to claim 2 wherein said fixed period during the cool cycle is different from the fixed period during the heat cycle.

6. A thermostat system according to claim 5 wherein said fixed period during the cool cycle is approximately ten minutes and the fixed period during the heat cycle is approximately six minutes.

7. A thermostat system for controlling heating and cooling systems supplying an indoor area to maintain desired ambient temperatures during selected time periods in said area, said thermostat system comprising;
(a) temperature sensing means including at least one temperature sensor for sensing the ambient temperature of said area and for providing a digital signal indicative thereof;
(b) means for generating time signals;
(c) digital circuit means having a plurality of input and output terminals, said digital circuit means being coupled to said time signal means and said temperature sensing means for receiving said time signals and for monitoring said ambient temperature, said digital circuit means including logic circuitry for storing digital coded information entered therein while said information is being processed, said digital circuit means being responsive to real time and ambient temperature and to said digital coded information for controlling the heating and cooling systems in accordance with an electronic threshold hysteresis temperature which is variable with time in discrete steps around said desired ambient temperature, said hysteresis temperature varying in a stairstep manner around said desired ambient temperature;
(d) data entry means coupled to said digital circuit means for entering said digital coded information into said digital circuit means;
(e) display means for displaying desired parameters of time and temperature including information entered from said data entry means; and
(f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

8. A thermostat system for controlling heating and cooling systems supplying an indoor area to maintain desired ambient temperatures during selected time periods in said area, said thermostat system comprising;
(a) temperature sensing means including at least one temperature sensor for sensing the ambient temperature of said area and for providing a digital signal indicative thereof;
(b) means for generating time signals;
(c) digital circuit means having a plurality of input and output terminals, said digital circuit means being coupled to said time signal means and said temperature sensing means for receiving said time signals and for monitoring said ambient temperature, said digital circuit means including logic circuitry for storing digital coded information entered therein while said information is being processed, said digital circuit means being responsive to real time and ambient temperature and to said digital coded information for controlling the heating and cooling systems in accordance with an electronic threshold hysteresis temperature which is variable with time in discrete steps around said desired ambient temperature and including a second variable threshold hysteresis which varies in discrete steps around said desired ambient temperature and means for selecting either of said variable threshold hysteresis characteristics to control the ambient temperature;
(d) data entry means coupled to said digital circuit means for entering said digital coded information into said digital circuit means;
(e) display means for displaying desired parameters of time and temperature including information entered from said data entry means; and
(f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

9. A thermostat system for controlling heating and cooling systems supplying an indoor area to maintain desired ambient temperatures during selected time periods in said area, said thermostat system comprising;
(a) temperature sensing means including at least one temperature sensor for sensing the ambient temperature of said area and for providing a digital signal indicative thereof;
(b) means for generating time signals;
(c) digital processor means having a plurality of input and output terminals, said digital processor means being coupled to said time signal means and said temperature sensing means for receiving said time signals and for continually monitoring said ambient temperature, said digital processor means including a memory for storing digital coded information entered therein while said information is being processed, said digital processor means being responsive to real time and ambient temperature and to said digital coded information for controlling the heating and cooling systems in accordance with a stored instruction sequence which provides an electronic threshold hysteresis temperature which is variable with time in discrete steps around said desired ambient temperature, said electronic threshold hysteresis characteristic limits the cycling rate of the heating system in the range of five to eight cycles per hour and the cooling system in the range of two to five cycles per hour;
(d) data entry means coupled to said digital processor means for entering said digital coded information into said digital processor means;
(e) digital display means for displaying desired parameters of time and temperature including information entered from said data entry means; and (f) electrically controllable switch means coupled to at least one of said output terminals for selectively activating and deactivating said heating and cooling systems in accordance with a signal from said digital processor means derived from a comparison of the embient temperature with the electronic threshold hysteresis temperature.

10. A thermostat system for controlling heating and cooling systems supplying an indoor area to maintain desired ambient temperatures during selected time periods in said area, said thermostat system comprising;
   (a) temperature sensing means including at least one temperature sensor for sensing the ambient temperature of said area and for providing a digital signal indicative thereof;
   (b) means for generating time signals;
   (c) digital processor means having a plurality of input and output terminals, said digital processor means being coupled to said time signal means and said temperature sensing means for receiving said time signals and for continually monitoring said ambient temperature, said digital processor means including a memory for storing digital coded information entered therein while said information is being processed, said digital processor means being responsive to real time and ambient temperature and to said digital coded information for controlling the heating and cooling systems in accordance with a stored instruction sequence which provides an electronic threshold hysteresis temperature which is variable with time in discrete steps around said desired ambient temperature, said discrete steps successively approach the ambient temperature;
   (d) data entry means coupled to said digital processor means for entering said digital coded information into said digital processor means;
   (e) digital display means for displaying desired parameters of time and temperature including information entered from said data entry means; and
   (f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

11. A thermostat system for controlling heating and cooling systems supplying an indoor area to maintain desired ambient temperatures during selected time periods in said area, said thermostat system comprising;
   (a) temperature sensing means including at least one temperature sensor for sensing the ambient temperature of said area and for providing a digital signal indicative thereof;
   (b) means for generating time signals;
   (c) digital processor means having a plurality of input and output terminals, said digital processor means being coupled to said time signal means and said temperature sensing means for receiving said time signals and for continually monitoring said ambient temperature, said digital processor means including a memory for storing digital coded information entered therein while said information is being processed, said digital processor means being responsive to real time and ambient temperature and to said digital coded information for controlling the heating and cooling systems in accordance with a stored instruction sequence which provides an electronic threshold hysteresis temperature which is variable with time in discrete steps around said desired ambient temperature, said memory produces a threshold hysteresis temperature characteristic which is a first value for a fixed period of time and changes to at least a second value unless the ambient temperature reaches said first value before such change to said second value which activates or deactivates said heating and cooling system causing said threshold hysteresis temperature to change to a first value of opposite polarity around said desired ambient temperature from said first value and remain at said first value of opposite polarity for a fixed period of time and then change to at least a second value of opposite polarity unless the ambient temperature reaches said first value of opposite polarity before such change to said at least second value of opposite polarity which again activates or deactivates said heating and cooling system;
   (d) data entry means coupled to said digital processor means for entering said digital coded information into said digital processor means;
   (e) digital display means for displaying desired parameters of time and temperature including information entered from said data entry means; and
   (f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

12. A thermostat system according to claim 11 wherein said first temperature value is equal to said first temperature value of opposite polarity.

13. A thermostat system according to claim 12 wherein said equal value is in the range of 0° to 1° F.

14. A thermostat system according to claim 11 wherein said fixed period during the cool cycle is different from the fixed period during the heat cycle.

15. A thermostat system according to claim 14 wherein said fixed period during the cool cycle is approximately ten minutes and the fixed period during the heat cycle is approximately six minutes.

16. A thermostat system for controlling heating and cooling systems supplying an indoor area to maintain desired ambient temperatures during selected time periods in said area, said thermostat system comprising;
   (a) temperature sensing means including at least one temperature sensor for sensing the ambient temperature of said area and for providing a digital signal indicative thereof;
   (b) means for generating time signals;
   (c) digital processor means having a plurality of input and output terminals, said digital processor means being coupled to said time signal means and said temperature sensing means for receiving said time signals and for continually monitoring said ambient temperature, said digital processor means including a memory for storing digital coded information entered therein while said information is being processed, said digital processor means being responsive to real time and ambient temperature and to said digital coded information for controlling the heating and cooling systems in accordance with a stored instruction sequence which provides an electronic threshold hysteresis temperature which is variable with time in discrete steps around said desired ambient temperature, said hysteresis temperature varying in a stairstep manner around said desired ambient temperature;

(d) data entry means coupled to said digital processor means for entering said digital coded information into said digital processor means;

(e) digital display means for displaying desired parameters of time and temperature including information entered from said data entry means; and (f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

17. A thermostat system for controlling heating and cooling systems supplying an indoor area to maintain desired ambient temperatures during selected time periods in said area, said thermostat system comprising;

(a) temperature sensing means including at least one temperature sensor for sensing the ambient temperature of said area and for providing a digital signal indicative thereof;

(b) means for generating time signals;

(c) digital processor means having a plurality of input and output terminals, said digital processor means being coupled to said time signal means and said temperature sensing means for receiving said time signals and for continually monitoring said ambient temperature, said digital processor means including a memory for storing digital coded information entered therein while said information is being processed, said digital processor means being responsive to real time and ambient temperature and to said digital coded information for controlling the heating and cooling systems in accordance with a stored instruction sequence which provides an electronic threshold hysteresis temperature which is variable with time in discrete steps around said desired ambient temperature and including a second variable threshold hysteresis which varies in discrete steps around said desired ambient temperature and means for selecting either of said variable threshold hysteresis characteristics to control the ambient temperature;

(d) data entry means coupled to said digital processor means for entering said digital coded information into said digital processor means;

(e) digital display means for displaying desired parameters of time and temperature including information entered from said data entry means; and (f) electrically controllable switch means coupled to at least one of said output terminals for selectively activating and deactivating said heating and cooling systems in accordance with a signal from said digital processor means derived from a comparison of the ambient temperature with the electronic threshold hysteresis temperature.

* * * * *